(12) United States Patent
Washisu

(10) Patent No.: US 7,432,953 B2
(45) Date of Patent: Oct. 7, 2008

(54) IMAGE-TAKING APPARATUS DETECTING VIBRATION AND CORRECTING IMAGE BLURRING

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 686 days.

(21) Appl. No.: 10/929,517

(22) Filed: Aug. 31, 2004

(65) Prior Publication Data

US 2005/0057662 A1    Mar. 17, 2005

(30) Foreign Application Priority Data

Sep. 2, 2003    (JP)    ............... 2003-309671

(51) Int. Cl.
*H04N 5/228* (2006.01)
*G03B 17/00* (2006.01)

(52) U.S. Cl. .................. 348/208.5; 348/208.11; 348/208.12; 348/296; 348/364; 396/54; 396/55

(58) Field of Classification Search ............ 348/208.99, 348/208.1, 208.4, 208.5, 208.7, 208.11, 208.13, 348/219.1
See application file for complete search history.

(56) References Cited

U.S. PATENT DOCUMENTS

| | | | |
|---|---|---|---|
| 4,965,619 A * | 10/1990 | Shikaumi et al. .............. 396/55 |
| 5,479,236 A * | 12/1995 | Tanaka ......................... 396/55 |
| 5,946,503 A | 8/1999 | Washisu ....................... 396/55 |
| 5,974,268 A | 10/1999 | Washisu ....................... 396/55 |
| 6,091,448 A | 7/2000 | Washisu et al. ............. 348/208 |
| 6,154,611 A | 11/2000 | Washisu ....................... 396/55 |
| 6,332,060 B1 * | 12/2001 | Miyamoto et al. ............ 396/55 |
| 6,670,986 B1 * | 12/2003 | Ben Shoshan et al. ... 348/219.1 |
| 7,239,342 B2 * | 7/2007 | Kingetsu et al. ......... 348/208.4 |
| 7,268,336 B2 * | 9/2007 | Hsieh et al. .............. 250/208.1 |
| 2002/0163581 A1 * | 11/2002 | Kitazawa et al. ......... 348/208.6 |

FOREIGN PATENT DOCUMENTS

| JP | H4 1992-95932 | 3/1992 |
|---|---|---|
| JP | H9 1997-261526 | 10/1997 |
| JP | 2720955 | 11/1997 |
| JP | 2004-7220 | 1/2004 |

* cited by examiner

*Primary Examiner*—Ngoc-Yen Vu
*Assistant Examiner*—Christopher K Peterson
(74) *Attorney, Agent, or Firm*—Fitzpatrick, Cella, Harper & Scinto

(57) ABSTRACT

An image-taking apparatus which improves accuracy of taken images by correcting image blurring is disclosed. The image-taking apparatus comprises an image pickup element which photoelectrically converts an object image formed by an image-taking optical system; a detection sensor which detects vibration; and a control circuit which controls driving of a correcting lens unit being disposed in the image-taking optical system and correcting image blurring by moving within a plane substantially orthogonal to the optical axis.

7 Claims, 27 Drawing Sheets

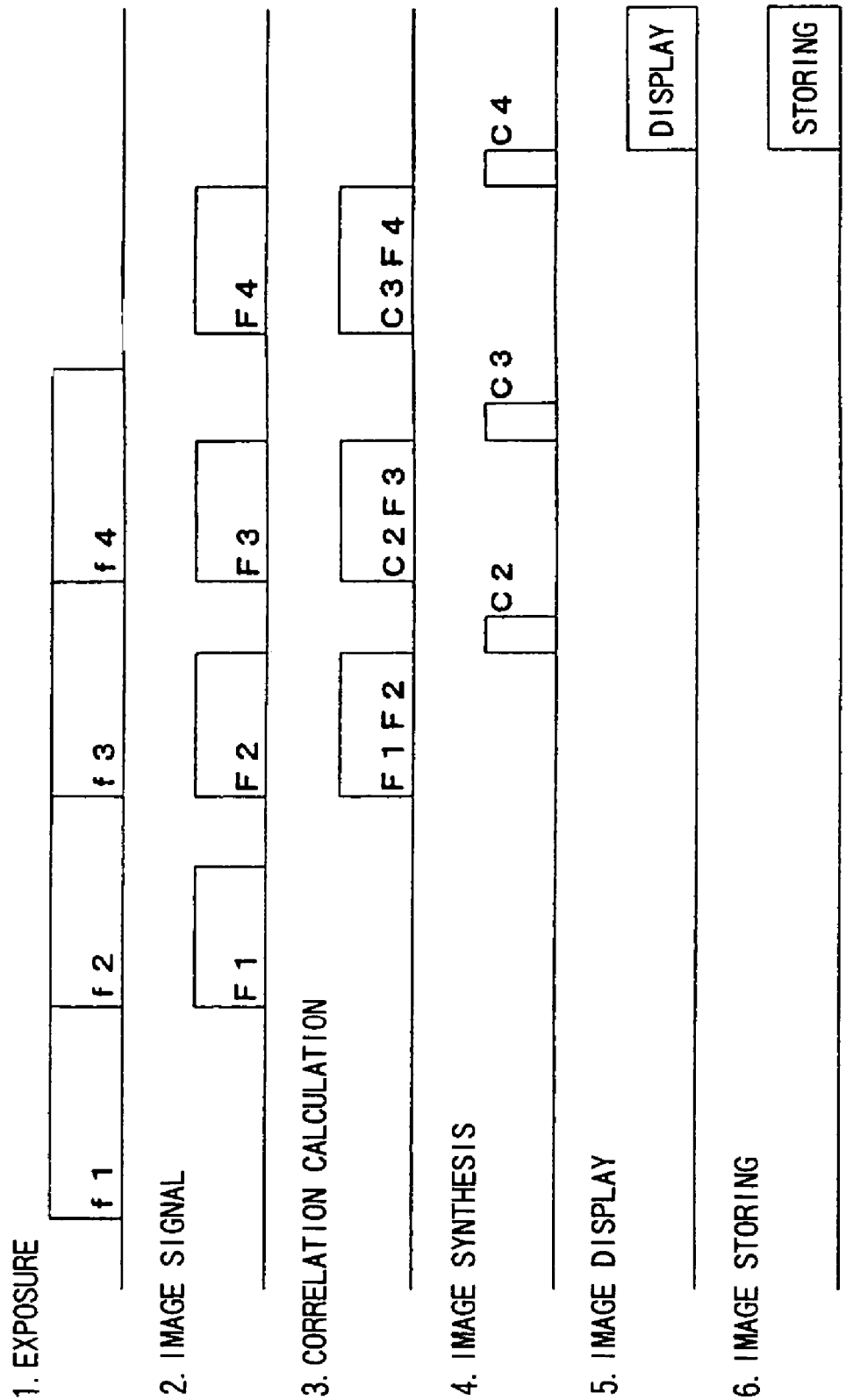

IMAGE-TAKING APPARATUS DETECTING VIBRATION AND CORRECTING IMAGE BLURRING

BACKGROUND OF THE INVENTION

1. Field of the Invention

The present invention relates to an image-taking apparatus which improves accuracy of taken images by correcting image blurring caused by vibration.

2. Description of Related Art

In cameras currently used, operations important for image-taking operation such as exposure determination and focusing, etc., are all automated, and it is very rare that even a person who is not skilled in the camera operations fails image-taking. Recently, a system that represses vibration applied to the camera has also been studied and factors that cause a photographer to fail image-taking have almost been eliminated.

Herein, a vibration control system that represses image blurring (image deflection on an image surface) is briefly described. Vibration of a camera when taking an image is normally vibration with a frequency of 1 Hz through 10 Hz, and as a basic idea that makes it possible to take an image without image blurring even when such vibration occurs during exposure, when an optical vibration control system is taken as an example, it is required that vibration of a camera due to hand vibration is detected and according to the results of this detection a correcting optical unit (comprising a correcting lens and a supporting frame, etc.) is displaced within an optical axis orthogonal plane. Namely, in order to take an image without image blurring even when the camera vibrates, first, the camera vibration must be accurately detected, and second, the optical axis change due to the vibration must be corrected.

In principle, image blurring can be corrected by mounting a vibration detection unit which detects the acceleration, the angular acceleration, the angular velocity, and the angular displacement, by using an accelerometer, vibration gyro, or laser gyro, and carries out proper calculation with respect to the results of this detection, for the camera. Image blurring is corrected by driving a correcting optical unit that makes the image-taking optical axis eccentric depending on the camera vibration detection data supplied from the vibration detection unit.

As the vibration control system, in addition to the above-described optical vibration control system, an electronic vibration control system (electronic correcting system) has also been proposed which repeats image-taking operation a plurality of times with an exposure period the length of which does not cause image blurring, and synthesizes images taken by the plurality of times of image-taking operations while correcting deviations of the images to obtain a taken image (synthesized image) with a long exposure period. This technique has been disclosed in Japanese Patent Application Laid-Open No. H9(1997)-261526.

Recent digital cameras have become smaller than silver-halide compact cameras, and have been so reduced in size that they can be built in a portable electronic apparatus (for example, a portable phone). Under these circumstances, in order to install the above-described optical vibration control system in the camera, the correcting optical unit must be made smaller. However, there is a limitation in downsizing the correcting optical unit since it must support a correcting lens and drive the correcting lens with high accuracy in a large stroke according to vibration.

On the other hand, in the electronic vibration control system disclosed in Japanese Patent Application Laid-Open No. H9 (1997)-261526, the exclusive correcting lens, etc., used in the above-described optical vibration control system becomes unnecessary, so that the entire product can be downsized. Furthermore, the method in which the exposure period for one time image-taking operation is shortened and images obtained through a plurality of times of image-taking operations are synthesized has an advantage in that the vibration control accuracy increases as the exposure period for one time image-taking operation becomes shorter. However, as the exposure period for one time image-taking operation becomes shorter, underexposure increases and image data accuracy lowers, so that it is not possible to obtain an excellent image. In addition, in this method, deviations among the images are detected from characteristic point changes on the images and are corrected, however, in a case where the image exposure is not sufficient at all, characteristic points on the images cannot be reliably identified, and accuracy of correction of deviations among the images lowers and it becomes impossible to synthesize an excellent image. Namely, in the electronic vibration control system, a great vibration control effect cannot be expected.

SUMMARY OF THE INVENTION

One aspect of an image-taking apparatus according to the invention comprises an image pickup element which photoelectrically converts an object image formed by an image-taking optical system; a detection sensor which detects vibration; and a control circuit which controls driving of a correcting lens unit being disposed in the image-taking optical system and correcting image blurring by moving within a plane substantially orthogonal to the optical axis. Here, in a case where it is not possible to move the correcting lens unit according to a result of the detection by the detection sensor during an image-taking operation, the control circuit stops the image-taking operation, and restarts the image-taking operation after moving the correcting lens unit to a reference position.

Another aspect of an image-taking apparatus comprises an image pickup element which photoelectrically converts an object image formed by an image-taking optical system, a drive mechanism which moves the image pickup element within a plane substantially orthogonal to the optical axis, a detection sensor which detects vibration, and a control circuit which corrects image blurring by controlling driving of the drive mechanism based on a result of the detection by the detection sensor. Here, in a case where it is not possible to move the image pickup element according to a result of the detection by the detection sensor during an image-taking operation, the control circuit stops the image-taking operation, and restarts the image-taking operation after moving the image pickup element to a reference position.

The characteristics of the image-taking apparatus of the invention will be clarified by the following detailed description of embodiments with reference to the drawings.

BRIEF DESCRIPTION OF THE DRAWINGS

FIG. 7 is a timing chart showing image-taking processing in Embodiment 2 of the invention.

DETAILED DESCRIPTION OF THE PREFERRED EMBODIMENTS

Embodiment 1

Figure 1:
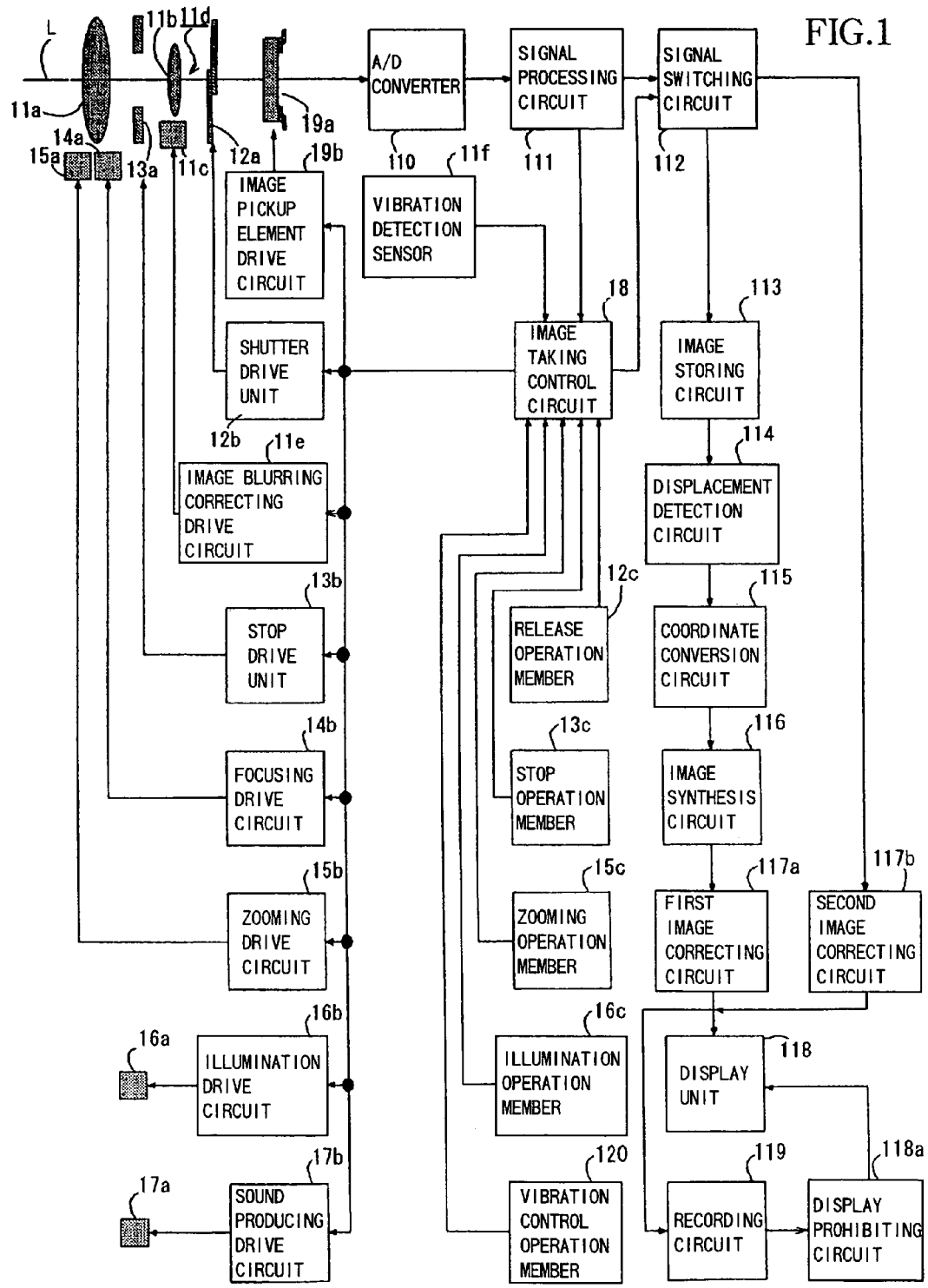
FIG. 1 is a diagram showing the structure of a camera according to Embodiment 1 of the invention.

FIG. 1 is a schematic view showing a structure of a camera (image-taking apparatus) according to Embodiment 1 of the present invention. In FIG. 1, an incident light flux (image-taking light) from image-taking lenses 11a and 11b is limited in light amount by a stop 13a, and then passes through a shutter 12a, and the image thereof is formed on an image pickup element 19a. The image-taking lens 11b is a correcting lens which corrects image blurring by moving within a plane orthogonal to the optical axis L. The correcting lens 11b and a correcting lens drive mechanism 11c constitute a correcting optical unit 11d. An image pickup element 19a consists of an MOS or a CCD, and is driven by an image pickup device driving circuit 19b.

The image-taking lenses 11a and 11b are further formed of a plurality of optical lens units, and a part or all of these lens units move in the optical axis L direction by receiving a driving force from an AF drive motor 14a and stop at predetermined in-focus positions to carry out focusing. The AF drive motor 14a is driven by receiving a drive signal from a focusing drive circuit 14b. Furthermore, a part of the optical lens units of the image-taking lenses move in the optical axis L direction by receiving a driving force from a zooming drive motor 15a and stop at predetermined zooming positions to change the angle of image-taking field. The zooming drive motor 15a is driven by receiving a drive signal from a zooming drive circuit 15b.

A vibration detection sensor 11f is formed of a vibration gyro, etc., which detects the angular velocity of vibration applied to the camera, and an output of the vibration detection sensor 11f is input into an image-taking control circuit 18 described later. The correcting optical unit 11d is driven by a image blurring correcting drive circuit 11e that is controlled by the image-taking control circuit 18 to repress image blurring. The stop 13a has a plurality of stop blades, and these stop blades move by receiving a driving force from a stop drive unit 13b to change the aperture area (stop diameter) of a light passing aperture. The shutter 12a has a plurality of shutter blades, and these shutter blades move with respect to an aperture through which the image-taking light flux pass by receiving a driving force from a shutter drive unit 12b to control the light amount of the light flux to be made incident on the image pickup element 19a. Furthermore, according to conditions (object luminance, etc.) when taking an image, an illumination unit 16a is driven (emits light) by receiving a drive signal from an illumination drive circuit 16b. Furthermore, a speaker 17a is driven (produces a sound) by receiving a drive signal from a sound producing drive circuit 17b for informing a photographer of the image-taking operations.

The driving of the image blurring correcting drive circuit 11e, the focusing drive circuit 14b, the zooming drive circuit 15b, the stop drive unit 13b, the shutter drive unit 12b, the illumination drive circuit 16b, and the sound producing drive circuit 17b is controlled by the image-taking control circuit 18, respectively.

Into the image-taking control circuit 18, operation signals from a release operation member 12c, a stop operation member 13c, a zooming operation member 15c, a illumination operation member 16c, and a vibration control operation member 120 described later are input, and according to the image-taking status of the camera, the operation signals are supplied to the focusing drive circuit 14b, the zooming drive circuit 15b, the stop drive unit 13b, the shutter drive unit 12b, and the illumination drive circuit 16b and the image-taking conditions are set, and thereafter, image-taking operation is carried out.

Furthermore, the aperture diameter of the stop 13a and the emission of the illumination unit 16a are normally automatically set by the camera side when taking an image, so that the stop operation member 13c and the flashing drive circuit 16b are not necessary, however, they are provided so that a photographer can arbitrarily set the aperture diameter and the emission.

The image-taking control circuit 18 measures the object luminance (photometry) on the basis of the image signals taken-in by a signal processing circuit 111 described later, and sets the stop diameter of the stop 13a and the closing timing of the shutter 12a (exposure period) on the basis of the results of this photometry. The image-taking control circuit 18 calculates the in-focus position of the image-taking lens (focusing lens) 11a on the basis of an output from the signal processing circuit 111 while driving the focusing drive circuit 14b.

Signals output from the image pickup element 19a are converted into digital signals by an A/D converter 110 and input into the signal processing circuit 111. The signal processing circuit 111 applies signal processing to the input signals to form luminance signals or color signals, thereby forming color video signals. Thereafter, the video signals produced by the signal processing circuit 111 are input into a second image correcting circuit 117b via a signal switching circuit 112. In the second image correcting circuit 117b, gamma correction processing and compression processing are applied to the input signals. Output signals of the second image correcting circuit 117b are input into a display unit 118 and a recording circuit 119, whereby the taken image is displayed on the display unit 118 and recorded on the recording circuit 119.

Herein, when a photographer depresses halfway the release operation member 12c as a release button (turns sw1 on) in a case where a vibration control mode is set by operating the vibration control operation member 120, the vibration detection sensor 11f starts operating and data on vibration applied to the camera is input into the image-taking control circuit 18. For example, when an angular velocity meter such as a vibration gyro is used as the vibration detection sensor 11f, signals in which a low band (for example, a band equal to and lower than 0.2 Hz) has been attenuated in the vibration angular velocity data are input into the image-taking control circuit 18. This is for eliminating the low frequency band of the angular velocity meter since the low frequency band is low in signal accuracy The input angular velocity data is subjected to proper signal processing such as integration processing by the image-taking control circuit 18 and then output to the image blurring correcting circuit 11e. The image blurring correcting circuit 11e drives the correcting optical unit 11d according to the input signals. Thereby, image blurring due to vibration applied to the camera is optically repressed.

Furthermore, when a photographer depresses halfway the release operation member 12c, in addition to the abovementioned operations, image-taking preparation operation (including focusing and photometry) is started. Namely, when the image-taking preparation operation such as photometry and focusing is carried out, since optical vibration control has already acted, it becomes easy to capture an object and focusing accuracy is also increased. Then, on the basis of the photometric value obtained by the photometry, the closing timing of the shutter 12a (exposure period) and the stop diameter of the stop 13a are set. The diameter of the stop 13a is changed to a proper diameter at this point.

Next, when the photographer fully depresses the release operation member 12c (turns the sw2 on), exposure for image recording is started. Concretely, when the photographer fully depresses the release operation member 12c, charges accumulating in the image pickup element 19 are all temporarily reset, and charge storage operation is started again with a set image size. Then, at the point where the exposure period elapses, which was determined through photometry when the release operation member 12c was depressed halfway, the shutter 12a is closed, and while the shutter 12a is closed, charge transfer is carried out and after charge transfer, the shutter 12a is opened. Herein, the correcting optical unit 11d is continuously driven during exposure. In a case where the exposure period extends long (for example, ¼ seconds) and a great vibration occurs, the correction stroke of the correcting optical unit 11d (the correcting lens 11b) may become deficient.

Figure 2:
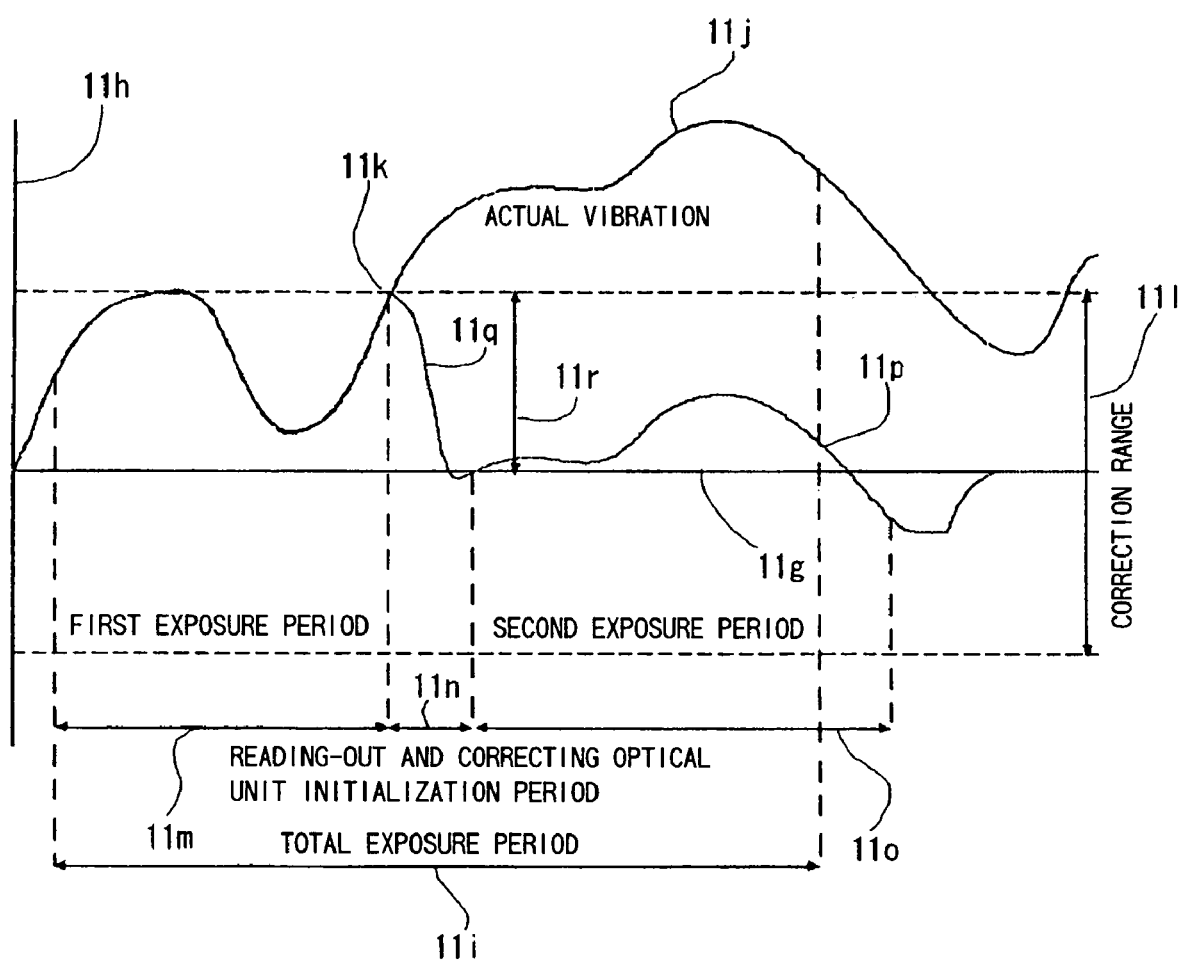
FIG. 2 is a diagram showing driving waveforms of a correcting optical unit in Embodiment 1 of the invention.

FIG. 2 shows waveforms for explaining this, wherein the horizontal axis 11g indicates the elapsed time and the vertical axis 11h indicates the amount of vibration or the amount of movement of the correcting optical unit 11d. Herein, the actual vibration waveform 11j within the total exposure period 11i exceeds the correction range 11l of the correcting optical unit 11d after the timing 11k. Therefore, in exposure after the timing 11k, optical vibration control becomes impossible, and therefore, an image with blur is generated.

In this embodiment, when the optical vibration control becomes impossible as described above, exposure is temporarily stopped and the correcting optical unit 11d (the correcting lens 11b) is returned to its initial position, and then exposure is started again, and finally, a plurality of taken images are synthesized to compensate underexposure.

Hereinafter, a detailed description is given. In FIG. 2, when the vibration exceeds the correction range 11l of the correcting optical unit 11d at the timing 11k, the shutter 12a is closed at this point and accumulated charges are readout, and the correcting optical unit 12a is returned to its initial position as shown by the waveform 11q. Here, the period 11n denotes the time required for reading out and initialization of the correcting optical unit 11d. Thereafter, the shutter 12a is opened again and charge storage operation is started again, and then the correcting optical unit 11d is caused to perform vibration control operation.

The second time exposure period (second exposure period 11o) is a remaining exposure period obtain by subtracting the first exposure period 11m during which exposure has already been carried out from the total exposure period 11i that provides proper exposure. Then, after the second exposure period elapses, the shutter 12a is closed and the accumulated charges are readout, and then the shutter 12a is opened and the exposure sequence is finished. In addition, when the vibration exceeds the correction range 11l of the correcting optical unit 11d within the second exposure period, exposure stopping, accumulated charge reading out, initialization of the correcting optical unit 11d, and exposure are repeated. Storing of the image data obtained by each exposure into a memory is carried out simultaneously with the abovementioned series of operations. When the image-taking operations are continued as mentioned above, the number of taken images changes according to the vibration magnitude, that is, the number of times of the vibration exceeded the correcting range 11l.

When vibration is slight or the total exposure period 11i is not so long, image-taking operation is finished without transition to re-image-taking operation so that the operation range of the correcting optical unit 11d does not exceed the correction range 11l during exposure. On the other hand, in a case where a great vibration, that is, vibration that cannot be corrected by the correcting operation of the correcting optical unit 11d frequently occurs, image-taking operation is carried out a plurality of times. After finishing image-taking operation a plurality of times, a plurality of taken images are stored in the memory.

The method of processing with respect to the plurality of images is described below.

As described above, in a case where the total exposure period is divided into the plurality of exposure period by the vibration exceeding the correction range 11l of the correcting optical unit 11d, each image obtained through each exposure is underexposed, however, vibration influence on the images is small. Then, exposure is improved by synthesizing the plurality of images into one image after finishing image-taking operation. However, when a plurality of images are taken, even when the images obtained through a plurality of times of image-taking operations are not influenced by vibration, the compositions in the respective images may slightly deviate due to the vibration during continuous image-taking operations. Therefore, if these images are synthesized as they are, the synthesized image is blurred due to the composition deviations among the images.

In response to the above-described continuous image-taking operations, plurality of image signals which are output for each image-taking operation from the image pickup element 19a are subjected to signal processing in the signal processing circuit 111 after being converted into digital signals by the A/D converter 110.

When the image-taking control circuit 18 is informed that the vibration control system is to be started by operating the vibration control operation member 120 and the vibration nearly exceeds the correction range 11l of the correcting optical unit 11d during exposure, the image data from the signal processing circuit 111 is input into an image storing circuit 113 via the signal switching circuit 112 (see FIG. 1). Namely, inputting into the second image correcting circuit 117b is interrupted. The image storing circuit 113 stores the entire plurality of taken images. A displacement detection circuit 114 extracts characteristic points in the images stored from the respective image storing circuit 113 and calculates the position coordinates of the characteristic points within the image-taking plane.

Figure 3:
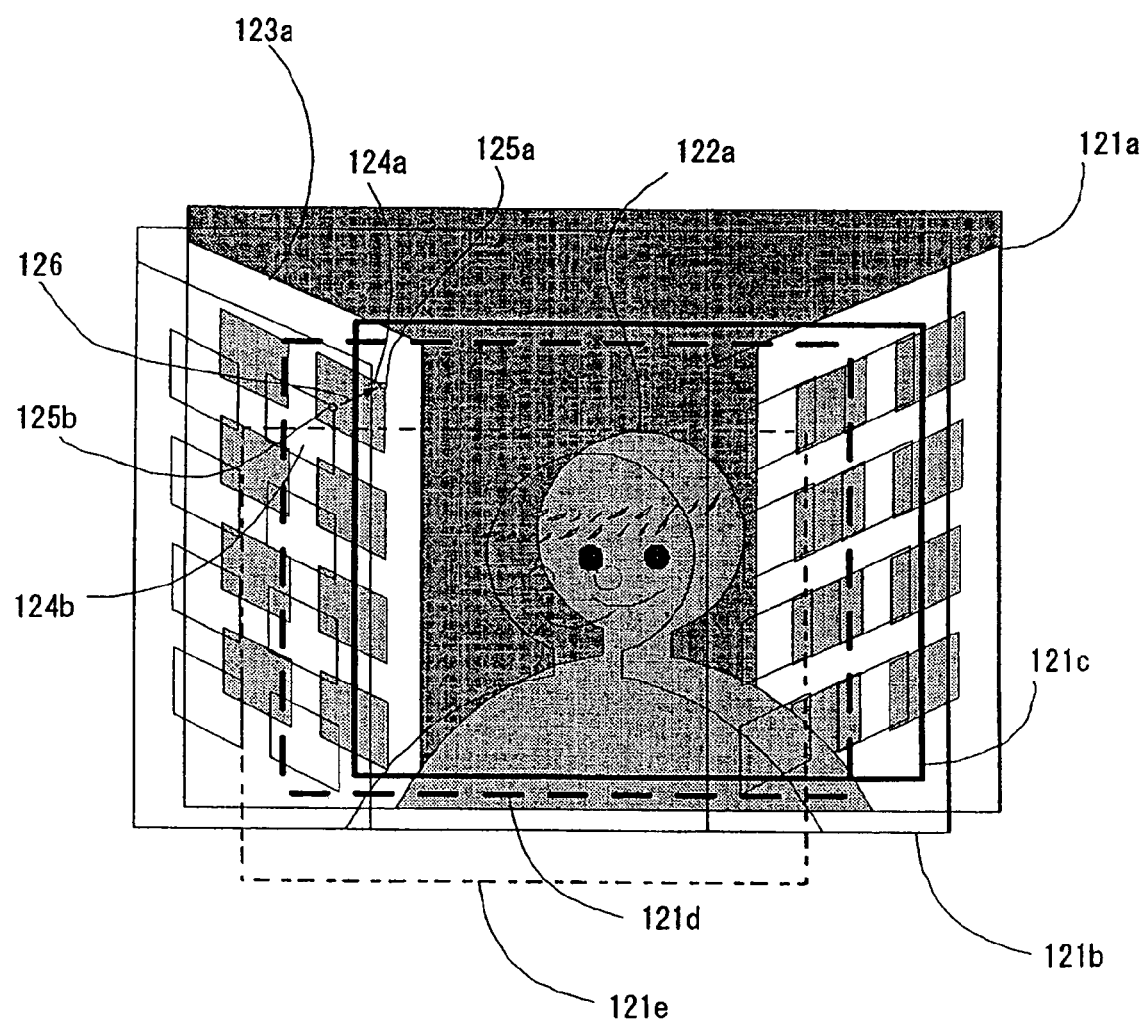
FIG. 3 is a diagram for explaining a coordinate conversion processing in Embodiment 1 of the invention.

For example, as shown in FIG. 3, in the frame 121a, it is assumed that an image of a person 122a standing against a building 123a is taken. In this case, when vibration exceeding the correction range 11l of the correcting optical unit 11d occurs and a plurality of times of image-taking operations are carried out, like the frame 121b, an image in which the composition deviates from the frame 121a may be taken.

The displacement detection circuit 114 extracts the edge 125a of a window 124a that is a point with high luminance in the building 123a positioned on the periphery of the image plane as a characteristic point by means of edge detection. Then, the characteristic point 125a is compared with the characteristic point 125b (the edge of a window 124b) in the frame 121b corresponding to the characteristic point 125a, and the difference between these is corrected (coordinate conversion). In FIG. 3, the coordinates of the frame 121b are converted so that the characteristic point 125b of the frame 121b conforms the characteristic point 125a of the frame 121a as shown by the arrow 126. Herein, the reason why the characteristic point is extracted from the periphery of the image-taking plane is described below.

In most of image-taking, a main object is positioned close to the center of the image plane and the main object is a person. In such a case, selection of the main object as a characteristic point poses a problem due to vibration of the main object. Namely, when image-taking is carried out a plurality of times, not only camera shaking but also object vibration influence the images obtained through the plurality of times of image-taking operations, so that the coordinate conversion processing is applied to the images on the basis of the object vibration. In this case, it seems that a preferable image is obtained since the coordinate conversion processing is applied so as to make the composition of the main object proper, however, the motion of a person is generally complicated and deviation detection accuracy is greatly influenced by the location where a characteristic point is extracted. For example, when an eye of a main object (person) is selected as a characteristic point, blinking influences, and when the tip of a hand is selected as a characteristic point, the hand easily moves and causes vibration different from the actual vibration of the entire main object. Even when image coordinate conversion processing is carried out by thus using a point of a person as a characteristic point, the entirety of the person is not always properly converted in coordinates, and in the case where a plurality of images are subjected to coordinate conversion processing and synthesized, the positions of the coordinates in the images scatter, so that a preferable image cannot be obtained.

Therefore, a more preferable image is obtained by selecting a motionless object such as a background as a characteristic point and applying image coordinate conversion processing as in this embodiment. However, in this case, the influence of the abovementioned object vibration appears.

Therefore, in this embodiment, for only the first one of the plurality of frames to be taken, the object is irradiated with light of the illumination unit 16a. Namely, the illumination unit 16a is made to emit light at the time of the first image-taking operation, and thereafter, when the second image-taking operation and subsequent image-taking operation are carried out in response to vibration exceeding the correction range 11l of the correcting optical unit 11d, the illumination unit 16a is not made to emit light. Herein, the image taken by using the illumination unit 16a is defined as the first image, and a plurality of images taken without using the illumination unit 16a are defined as a second image group. In this case, there is the following difference between the first image and the respective images of the second image group in addition to the composition deviations described above. That is, the brightness in the object region which the illumination light has reached in the first image is different from that of the same region in the respective images of the second image group. For the object which the illumination light has reached in the first image, sufficient exposure is obtained, and exposure of the background which the illumination light has not reached is insufficient. The reason for this is that, generally, the illumination light reaches the main object such as a person since the main object is near the camera, and on the other hand, the illumination light does not reach the background since the background is far from the camera. The underexposure of the background is compensated by synthesis of the first image and the second image group while correcting the composition deviations of the second image group from the composition of the first image.

Figure 4A:
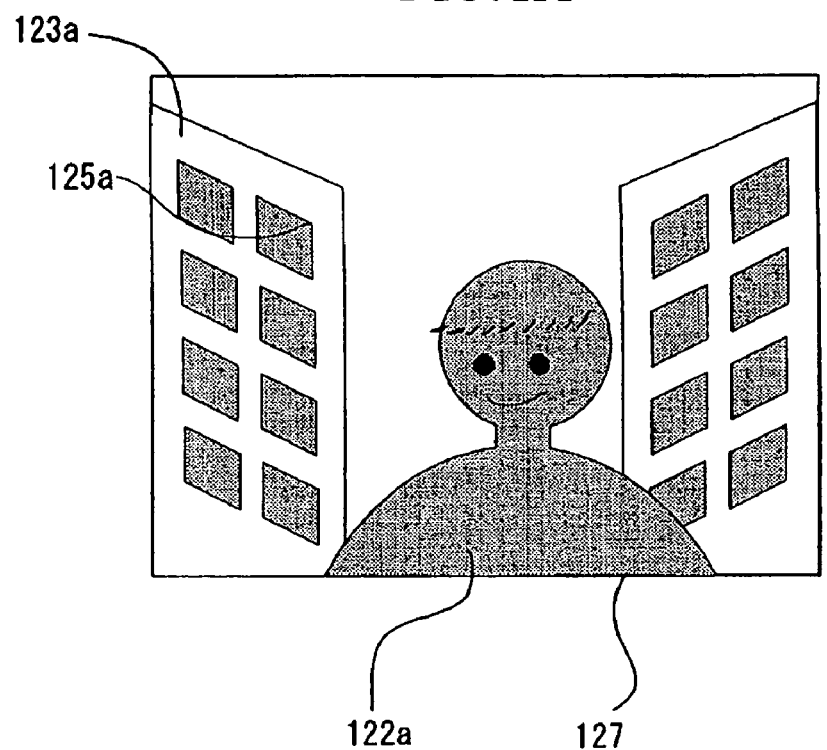
FIGS. 4A and 4B are diagrams for explaining a characteristic extraction region in Embodiment 1 of the invention.
Figure 4B:
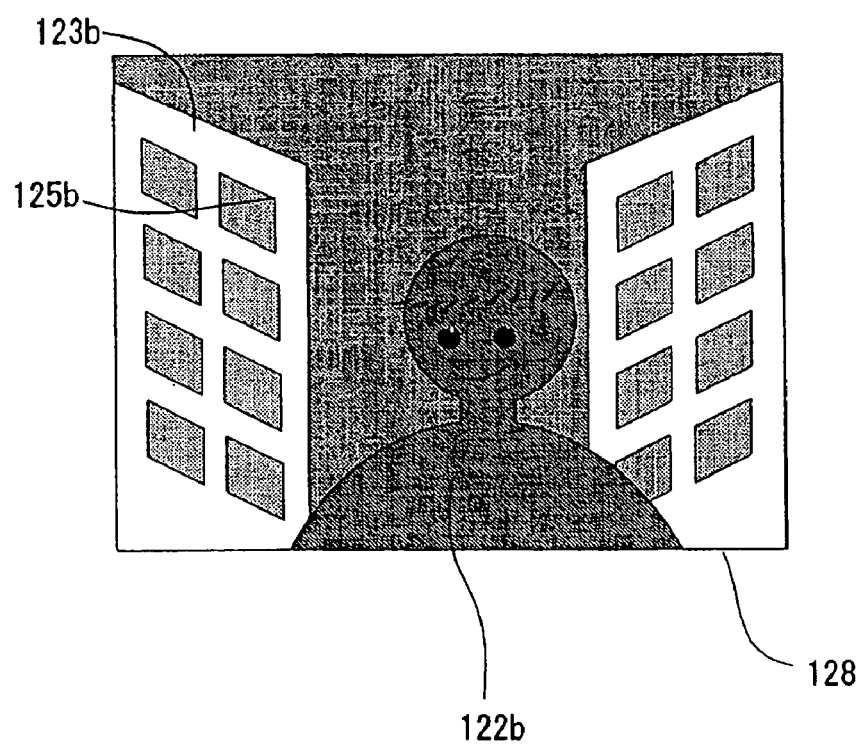

FIGS. 4A and 4B are diaphragm for explaining the selecting method for an extraction region of a characteristic point by the displacement detection circuit 114. When the first image 127 taken by using the illumination unit 16a and the second image group (one image 128 is shown as an example) taken without using the illumination unit 16a are compared, the illumination light has reached the person 122a in the first image 127, and the person 122b in the second image 128 is dark since the illumination light has not reached it. On the other hand, in the background which the illumination light has not reached, the characteristic points in the buildings 123a and 123b have no change in brightness between the first image 127 and the second image 128.

Thus, in the background region without change in brightness, the illumination light does not reach and exposure is insufficient, so that this background region is considered as a point of image synthesis, and composition deviations are corrected by selecting this background region as the characteristic point extraction region.

In FIG. 4, in the buildings 123a and 123b at the periphery of the image plane without a change in brightness between the first image 127 and the second image 128 as described above, the edges 125a and 125b of the window with high luminance are extracted as characteristic points by means of edge detection. Then, as described in FIG. 3, the characteristic point 125a in the first image 127 and the characteristic point 125b in the second image 128 are compared, and the difference between these is corrected (coordinate conversion). Namely, the coordinate conversion circuit 115 applies coordinate conversion processing to the second image 128 so that the characteristic point 125b of the second image 128 conforms the characteristic point 125a of the first image 127. Then, for the images of the second image group subsequent from the second one, coordinates of the characteristic points 125b are calculated respectively, and the coordinate conversion circuit 115 converts the coordinates of the images (second image group) so that the calculated coordinates of the characteristic points 125b conforms the coordinates of the characteristic point 125a in the first image 127.

Herein, the coordinates of the characteristic points of the respective images are calculated for the sake of explanation, however, in actuality, the first image 127 and the first one 128 of the second image group are subjected to correlation calculation processing, and the displacement detection circuit 114 calculates a change of pixels corresponding to each other among images as a motion vector and uses them as a characteristic point change. Then, for the images subsequent from the second one of the second image group, characteristic point changes are also calculated by means of correlation calculation processing with the first image 127, and thereafter, characteristic point changes of the images are determined in the same manner.

It is also possible that, in place of selection of only one point as a characteristic point, a plurality of points are selected and an average or the minimum scalar of motion vector of these points is used as a characteristic point change. Use of the minimum value as the characteristic point change is for selecting the most immovable characteristic point since a characteristic point selected at the periphery of the image plane may move by itself.

The images subjected to coordinate conversion processing by the coordinate conversion circuit 115 are output to an image synthesis circuit 116 and synthesized into one image. Thus, in this embodiment, the first image 127 taken by using the illumination unit 16a is used as a reference (center), and the respective images of the second image group 128 are subjected to coordinate conversion processing so as to conform the first image.

Herein, the reason why the first image 127 is a reference is described.

Figure 5:
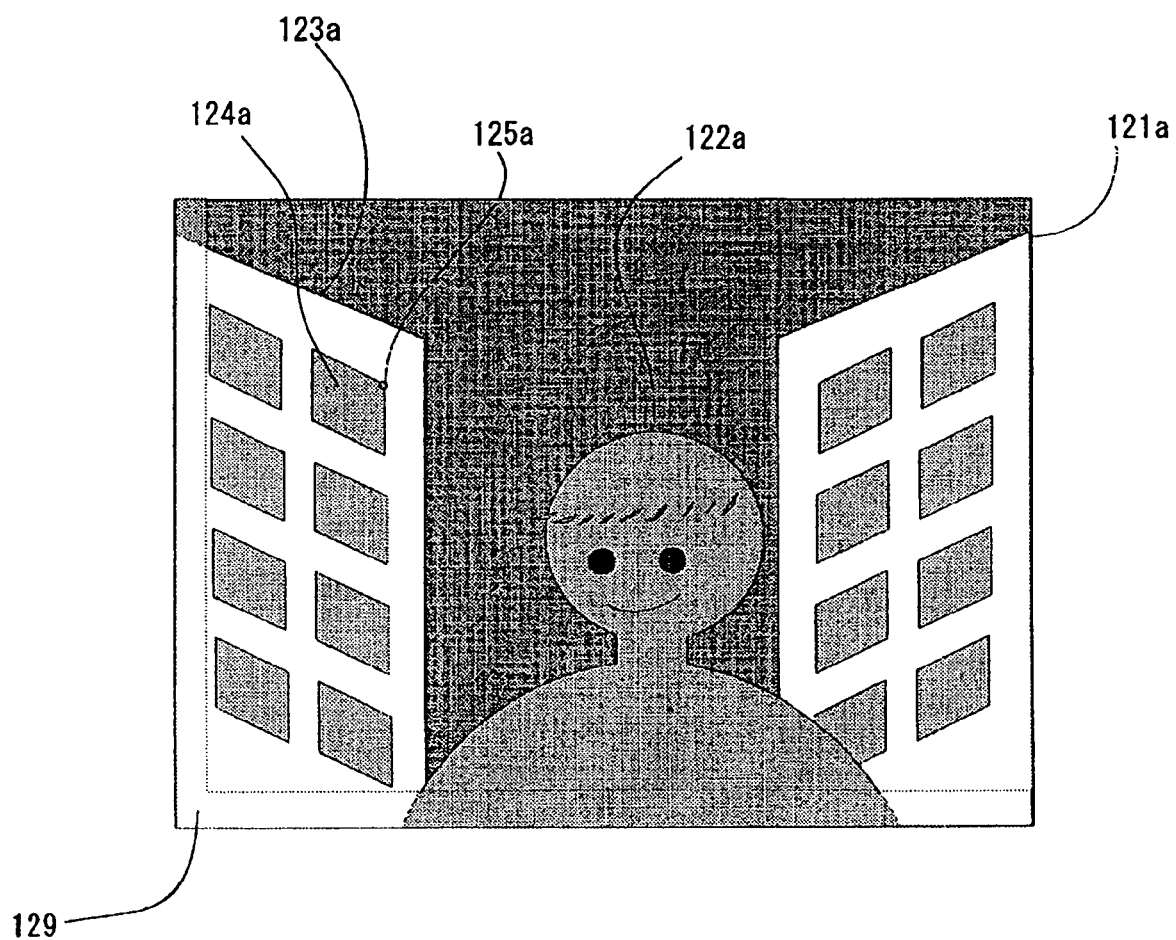
FIG. 5 is a diagram for explaining an image synthesis processing in Embodiment 1 of the invention.

When two images with compositions deviating from each other as shown in FIG. 4 are synthesized, a region 129 in which the two images do not conform may be created as shown in FIG. 5. The image synthesis circuit 116 cuts the region 129 and complements by spreading only the region in which the two images conform each other to the original frame size. Therefore, in the images of the second image group, the periphery of the image plane is cut according to the direction and degree of the composition deviation. In the first image 127 and the second image group, the most excellent image is the first image 127 taken by using the illumination unit 16a.

Therefore, in order not to cut the periphery of the first image 127, it is preferable that the first image 127 is used as a reference image and the images of the second image group are made to conform the first image 127.

In the case of digital images, even when only one underexposed image is taken, exposure can be corrected by increasing the gain, however, if the gain is increased, noise also increases and an undesirable image is obtained. However, as in this embodiment, in the case where many images are synthesized to increase the gain in total, the noises in the images are averaged, so that an image with a high S/N ratio can be obtained, and as a result, noise is reduced and exposure is made proper.

In another respect, for example, image-taking operation is carried out a plurality of times by setting a high sensitivity of the image pickup element 19a while allowing noise, and averaging processing is applied to the obtained images, whereby the random noise contained in the images is reduced.

Image data synthesized by the image synthesis circuit 116 is input into the first image correcting circuit 117a and subjected to gamma correction processing and compression processing, and furthermore, end deficient portions (corresponding to the region 129 in FIG. 5) of the images produced by synthesis processing are cut, and the portion reduced in image size is complemented by spreading. Namely, the region 129 in which the images do not conform in FIG. 5 is cut, and only the region in which the images conform is extracted and complemented by spreading. Thereafter, the synthesized image is recorded onto the recording circuit 119.

In the description given above, the deviations among the images are corrected by detecting the characteristic points of the images and deviations thereof, however, in the camera of this embodiment, since a vibration detection sensor 11f is provided, synthesis processing can be carried out after the coordinates of the images are converted on the basis of the amount of vibration between the first image-taking and the second image-taking (for example, the amount shown by the arrow 11r in FIG. 2) or the amounts of vibrations between the subsequent image-taking frames. With this structure, since the deviation detection processing of the displacement detection circuit 114 becomes unnecessary, the period of time to completion of the synthesized image can be shortened, and synthesis failures due to characteristic point detection failures can be repressed.

The point of Embodiment 1 is as described above, and other than this, this embodiment has the following new structural points.

1) When the vibration correctable stroke of the correcting optical unit 11d (correcting lens 11b) is reduced, vibration control changes from optical vibration control to electronic vibration control involving image synthesis processing (described above). Reduction in vibration correctable stroke of the correcting optical unit 11d includes not only the case where the operation of the correcting optical unit 11d according to vibration exceeds the correction range 11l as in this embodiment, but also the case where the operation nearly exceeds the correction range 11l.

2) In the case where re-image-taking operation (second and subsequent image-taking) is carried out, when the remaining exposure period necessary for proper exposure is very short, re-image-taking operation is not carried out.

3) When image-taking operation is carried out while panning, re-image-taking operation is not carried out.

4) The initially taken image is displayed on the display unit 118 of the camera and is not renewed.

The above 1) has already been described, so that 2) and the rest are described below.

As described in FIG. 2, when vibration exceeding the correction range 11l of the correcting optical unit 11d occurs during exposure, the exposure is temporarily stopped, the correcting optical unit 11d (the correcting lens 11b) is returned to its initial position and image-taking is carried out again. A second exposure period 11o in a case where image-taking is carried out again is a period of time determined by subtracting a first exposure period 11m of the first image-taking operation from a total exposure period 11i necessary for proper exposure.

However, when the second exposure period 11o is a very short remaining time, it is not necessary to carry out the second image-taking operation and image synthesis processing. The reason for this is that using the time required for the second image-taking operation to image-taking operation of the next object is better for improvement in mobility of the camera. As a matter of course, the image is slightly underexposed due to omission of the second image-taking operation.

For example, in a case where the total exposure period is 400 ms, the first exposure period 11*m* is 300 ms, and the second exposure period 11*o* is 100 ms, that is, the ratio of the first and second periods is 3 to 1, or the ratio of the second exposure period 11*o* to the first exposure period 11*m* is ⅓ or less, underexposure is not so great, so that the second image-taking operation is not carried out. Even in the case where image-taking operation is repeated not two times but as many as three or four times more, when the ratio of the remaining exposure period to the first exposure period 11*m* becomes equal to or less than the above-mentioned ratio of ⅓, re-image-taking operation is discontinued.

Furthermore, if re-image-taking operation is carried out during image-taking operation while panning the camera as in the case of camera panning shooting, the composition greatly changes between the first image-taking operation and the second image-taking operation due to the time difference. When a plurality of images are synthesized, deviation correction is carried out so that the characteristic points in the backgrounds of the images are made to conform, however, as in this case, the background deviates due to panning, the main object in the synthesized image deviates. In addition, when the characteristic point is extracted from the main object region and image synthesis processing is carried out, although the main object does not deviate, the background deviates between two images, so that a background image without image blurring by conforming images cannot be obtained. Therefore, in this image-taking condition, a more excellent image is obtained by correction by increasing the gain of the first image than by complement of the exposure by conforming the images. Therefore, when the vibration detection sensor 11*f* detects vibration of the camera during exposure and it is judged that the camera is being panned on the basis of the detection result, re-image-taking operation is not carried out.

Generally, in the case of a digital camera, a taken image is displayed on a back face liquid crystal monitor (display unit 118) of the camera after image-taking operation. However, as in this embodiment, when images are synthesized to complement exposure, it takes time from creation to display of a synthesized image. Therefore, in this embodiment, on the display unit 118 of the camera, an image before being synthesized is displayed. The reason for this is that, display of an underexposed image upon increasing the gain does not pose a problem in observation since the display unit 118 of the camera is small. In this case, when the illumination unit 16*a* is used, an image taken by using the illumination unit 16*a* is continuously displayed. Namely, in the case where the strobe is used for the first image-taking operation, an image obtained by the first image-taking operation is continuously displayed from the finish of the second and subsequent image-taking operation to the finish of image confirmation.

When continuous shooting is carried out with a normal digital camera, a taken image of the last frame in continuous shooting is continuously displayed on the display unit 118. However, in this embodiment, an image taken by using the illumination unit such as the first image (when rear-curtain flash sync is employed, the last image) is displayed by priority. The reason for this is that an image taken without the illumination is greatly different from the image to be actually obtained (synthesized image).

In a case where an image recorded on the recording circuit 119 is replayed, a display prohibiting signal from the recording prohibiting circuit 118*a* input into the display unit 118 of FIG. 1. As described above, when a plurality of images are taken and synthesized, a specified image is displayed immediately after image-taking operation. On the other hand, when an image is replayed after synthesis processing is completed, the display prohibiting circuit 118*a* does not display the specified image but displays the image after being completely synthesized so that the actual image can be confirmed.

Furthermore, in a case of the image playback mode, generally, all image data in the recording circuit 119 can be viewed, however, in the case where image-taking operation is carried out a plurality of times and images obtained through the plurality of times of image-taking operation are synthesized, the display prohibiting circuit 118*a* prevents the images before being synthesized from being viewed. The reason for this is that, if the plurality of images to be synthesized (the first image and the second image group) are displayed during playback, many images that the photographer does not recognize are displayed, not only taking a long time to browse the images, but also causing confusion. However, among the plurality of images to be synthesized, only the first image taken by using the illumination unit 16*a* is capable of being displayed during playback so that it is compared with the synthesized image.

Figure 6A:
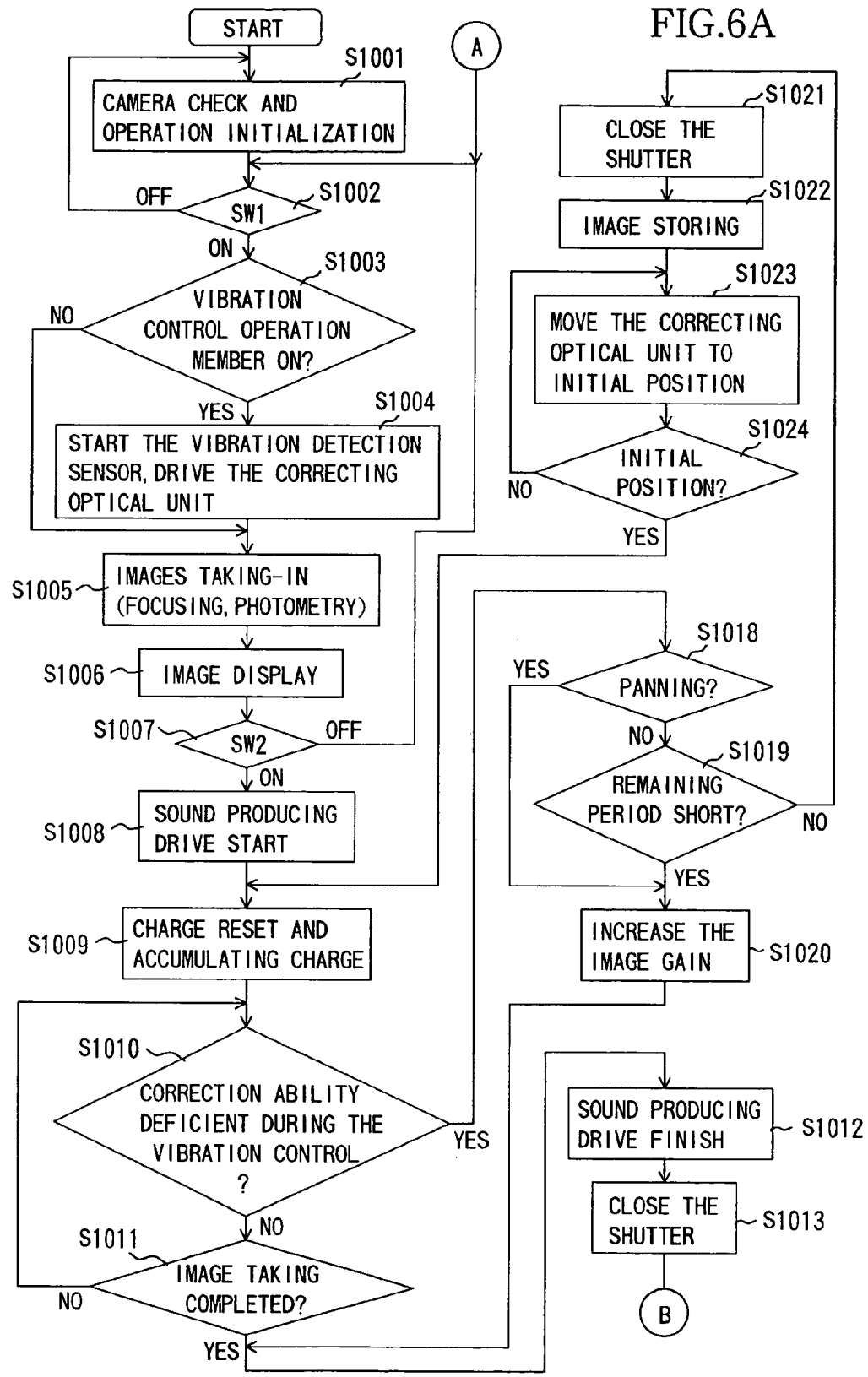
FIGS. 6A and 6B are flowcharts showing image-taking operations in Embodiment 1 of the invention.
Figure 6B:
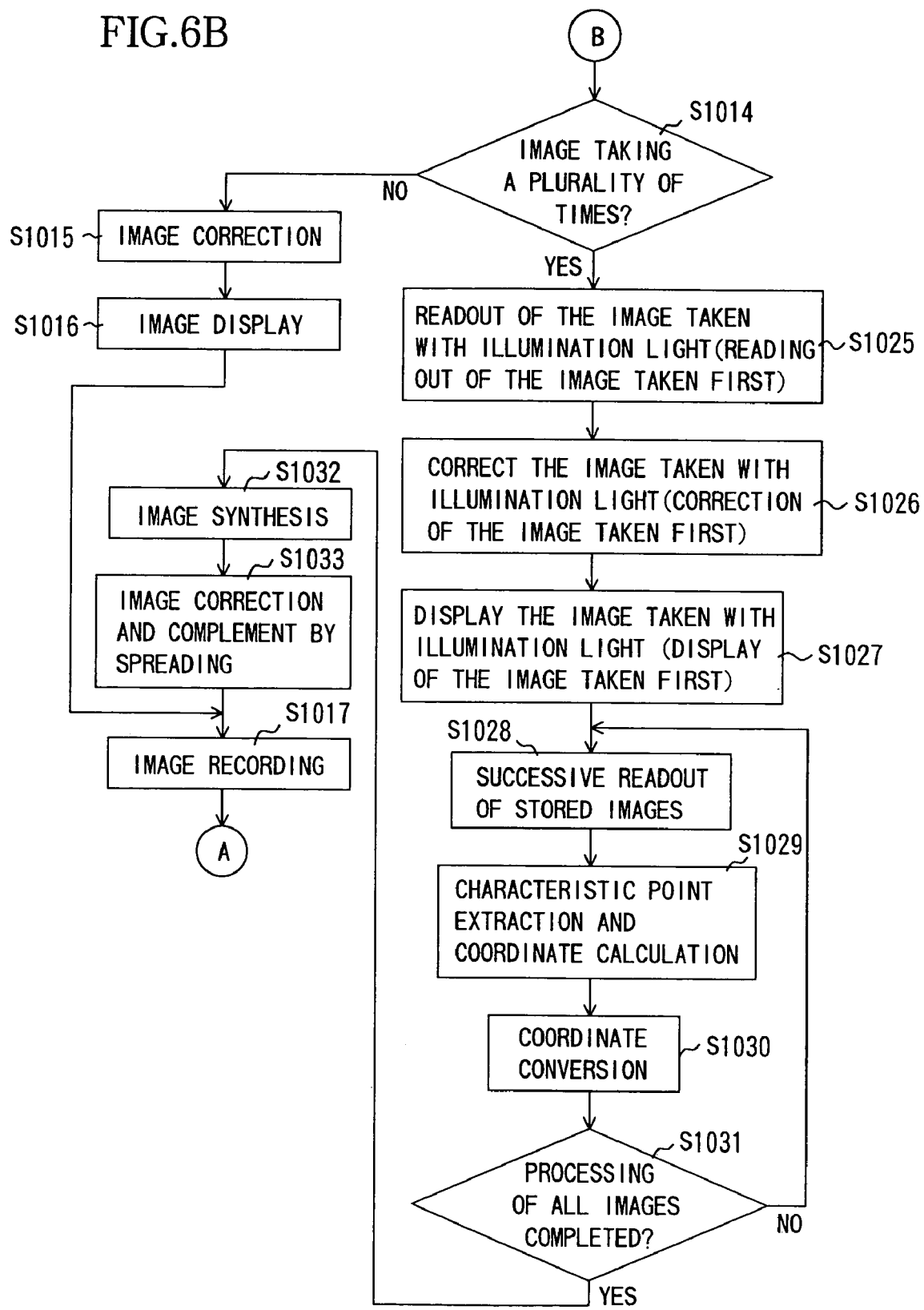

FIGS. 6A and 6B are flowcharts showing the image-taking operations of the camera according to Embodiment 1 of the invention, and this flow starts when the power source of the camera is turned on.

In Step S1001, the camera is checked and various functions are initialized. Concretely, the power source status and communications status are checked, and when the results of checking are not suitable for image-taking operation, processing such as indication is carried out. Furthermore, initializations processings including initialization of pulse encoders to be used for focusing control and initialization of calculation (resetting) of vibration control are carried out. In the next Step S1002, the process waits until the sw1 is turned on in response to half depression of the release operation member 12*c* by a photographer, and until the sw1 is turned on, the process returns to Step S1001 and continues camera checking processing and initializations processings. Then, when the sw1 is turned on, the process advances to Step S1003.

In Step S1003, it is determined whether or not the photographer has turned the vibration control operation member 120 on, and when the vibration control operation member 120 is turned on, the process advances to Step S1004. In Step S1004, the vibration detection sensor 11*f* is started and the output thereof is processed by the image-taking control circuit 18 and driving of the correcting optical unit 11*d* is started by the image blurring correcting circuit 11*e*. Then the process advances to Step S1005. On the other hand, when the vibration control operation member 120 is off, the process advances to Step S1005 by skipping Step S1004. In this case, the vibration detection sensor 11*f* is not started and the correcting optical unit 11*d* is not driven, either.

In Step S1005, image is taken by using the image pickup element 19*a*. The image-taking control circuit 18 drives the AF drive motor 14*a* by using the focusing drive circuit 14*b* to move the image-taking lens 11*a* in the optical axis L direction while detecting the contrast of the image on the basis of the output from the signal processing circuit 111. Then, when the contrast becomes highest, the driving of the image-taking lens 11*a* is stopped to obtain a focused status of the image-taking optical system (AF by means of the hill-climbing method). Focusing can also be carried out by using phase difference detection method. The image-taking control circuit 18 calculates the brightness of the object on the basis of the output of the image pickup element 19*a*, simultaneously.

Then, according to the image-taking conditions, an exposure period of the image-taking operation is calculated.

The image-taking conditions mentioned herein include the following four items.

Brightness of the object
Focal length of the image-taking optical system
Brightness (f-number) of the image-taking optical system
Sensitivity of the image pickup element For example, it is assumed that the sensitivity of the image pickup element 19a has been set to ISO speed 200. The brightness of an object is measured (photometry), and in order to obtain proper exposure on the basis of the results of this photometry, the stop 13a is fully opened (for example, f2.8) and the closing timing of the shutter 12a, that is, the exposure period is set to ⅛ seconds.

In the next Step S1006, the image picked up in Step S1005 is displayed on an external liquid crystal monitor (display unit 118) or the like of the camera. Then in the next Step S1007, the process waits while circulating Steps S1002 through S1007 until the sw2 is turned on in response to full depression of the release operation member 12c. Then, when the sw2 is turned on, the process advances to Step S1008.

In Step S1008, by driving the speaker 17a via the sound producing drive circuit 17b, a sound informing the start of image-taking is produced. This sound may be an electronic bleep sound, or a shutter opening sound or a mirror rising sound. In the next Step S1009, charges that have been accumulated in the image pickup element 19a up to this point are all reset, and charge storage operation is started again. Thereby, real exposure is started.

In Step S1010, a deficiency in correct ability when the vibration control is turned on is detected during exposure. More concretely, when vibration detected by the vibration detection sensor 11f during exposure reaches the limit value of the correction range 11l (FIG. 2) of the correcting optical unit 11d (timing 11k of the waveform 11p of FIG. 2), the process advances from Step S1010 to Step S1018. On the other hand, when there is no deficiency in correct ability, the process advances to Step S1011. The reason for using the expression "correction ability" is that, when the correcting optical unit 11d cannot sufficiently correct image blurring, not only is the correction range 11l deficient, but also there is a possibility that the vibration speed is high and the correcting optical unit 11d cannot follow the speed. For detection of the correction range 11l, a position detector is provided in the correcting optical unit 11d and the correcting position (movement position of the correcting lens 11b) is always monitored, or the image blurring correction target value to be supplied to the correcting optical unit 11d is monitored. Furthermore, the vibration speed may be determined, for example, on the basis of the derivative value of the image blurring correction target value. When the correction range 11l is not exceeded, the process advances to Step S1011 as described above.

In Step S1011, it is determined whether or not the exposure period has completely elapsed, and when the exposure period obtained in Step S1005 is reached, the process advances to Step S1012, and otherwise the process returns to Step S1010 and this flow is circulated until the exposure is completed while checking the correction ability of the correcting optical unit 11d.

In Step S1010, when the operation of the correcting optical unit 11d nearly exceeds the vibration correction range 11l during exposure, as described above, the process advances to Step S1018 and it is determined whether or not the camera is being panned. Concretely, when a higher angular velocity than a predetermined value is added for a predetermined period during exposure depending on the output of the vibration detection sensor 11f, it is determined that panning is being carried out. Actual detection of panning is not started in Step S1018 but is started prior to Step S1018. Then, when it is determined in Step S1018 that panning is being carried out, the process advances to Step S1020, and when it is determined that panning is not being carried out, the process advances to Step S1019.

When the camera mode is set to rear-curtain flash sync, exposure must be continued since the illumination unit has not emitted light yet. Therefore, in the rear-curtain flash sync mode, the process advances to Step S1019 without condition. Then, in Step S1019, it is determined whether or not the exposure is to be restarted according to the ratio of the remaining time until the finish of exposure to the total exposure period, and for example, when the ratio of the remaining exposure period to the total exposure period is less than ⅓, the process advances to Step S1020, and otherwise the process advances to Step S1021.

When the process advances to Step S1020, the gain of the image is increased according to omission of the remaining exposure period, and then the process advances to Step S1012.

On the other hand, when the remaining exposure period is long in Step S1019 and the remaining exposure must be carried out, the process advances to Step S1021, the shutter 12a is closed, and charges accumulated in the image pickup element 19a are transferred to the signal processing circuit 111. When this transfer is completed, the shutter 12a is opened. Then, in the next Step S1022, obtained image data is stored in the image storing circuit 113. In the next Step S1023, the correcting optical unit 11d (the correcting lens 11b) is moved to its initial position. Simultaneously, the shutter 12a is opened and the image of the light flux from the object is formed on the image pickup element 19a. Next, in Step S1024, the process waits while circulating Steps S1023 and S1024 until the correcting optical unit 11d is moved to its initial position. Then, when the correcting optical unit 11d moves at its initial position, the process returns to Step S1009 and exposure is started again.

When the correcting optical unit 11d thus nearly exceeds the correction range 11l during exposure, image data obtained through image-taking operation until this point is temporarily stored, and image-taking operation is started again (S1010 → S1019 to S1024 → S1009 . . . ). When the remaining exposure period is short or panning is carried out (when the answer of S1018 is NO, the answer of S1019 is NO), image-taking operation is not carried out again. This is for giving the mobility of the camera priority and repressing lowering in reliability of background image synthesis.

When the process advances from Step S1011 to Step S1012, by driving the speaker 17a via the sound producing drive circuit 17b, a sound informing completion of image-taking is produced. This sound may be an electronic bleep sound which is different from the electronic bleep sound in Step S1008, a shutter closing sound; or a mirror lowering sound. Thus, when a plurality of images are taken, the sounds informing the operations of image-taking are one set of sounds (each produced once when starting exposure of the first image-taking and when completing the exposure of the last image-taking), so that the sounds do not give a photographer discomfort even when image-taking is carried out a plurality of times. Namely, the number of sounds is equal in the case of normal image-taking operation (one exposure) and in the case of a plurality of times of image-taking operation, thereby preventing a photographer from feeling discomfort during image-taking operation.

In the next Step S1013, the shutter 12a is closed so as to block light reaching the image pickup element 19a, and then charges accumulated in the image pickup element 19a are transferred to the signal processing circuit 111 via the A/D converter 110. Thereafter, the correcting optical unit 11d is returned to the initial position for preparation for the next image-taking operation, and when charge transfer processing is finished, the shutter 12a is opened. In the next Step S1014, in the case where the vibration control system is operating, it is determined whether or not image-taking operation has been carried out a plurality of times due to the condition where the correcting optical unit 11d nearly exceeds the correction range 11l during exposure. Herein, when image-taking operation is carried out only one time, the process advances to Step S1015, and when image-taking operation is carried out two or more times, the process advances to Step S1025.

When it is determined that image-taking operation has been carried out only one time and the process advances to Step S1015, the second image correcting circuit 117b applies gamma correction processing and compression processing to input signals (data of one image). Then, in the next Step S1016, the output signals of the second image correcting circuit 117b are input into the display unit 118 and displayed on the display unit 118 provided on the back face of the camera. Thereafter, the process advances to Step S1017, and the output signals of the second image correcting circuit 117b are input into the recording circuit 119. Then, the process returns to Step S1002.

Furthermore, in the case where image-taking operation has been carried out a plurality of times and the process advances from Step S1014 to Step S1025, in Step S1025, the image taken by using the illumination unit 16a among the images obtained through the plurality of times of image-taking operation (the first image when the strobe is not used or front-curtain sync is set, and the last image when the rear-curtain flash sync is set) is readout from the image storing circuit 113. Then, in the next Step S1026, the readout image is corrected by the second image correcting circuit 117b and the gain is increased. When image-taking operation is carried out a plurality of times, each image is underexposed, so that the gain is increased for compensating underexposure when the image is displayed on the display unit 118.

In the next Step S1027, the image that has been corrected is input into the display unit 118 and displayed on the display unit 118. When the image is thus displayed on the display unit 118 provided on the back face of the camera, not the image obtained by synthesizing the images obtained through a plurality of times of image-taking operation, but one image among the images (the first image when images are taken without using the illumination unit 16a, and when the illumination unit 16a is used, the first image in the case of front-curtain flash sync, and the last image in the case of rear-curtain flash sync) is displayed to improve the mobility. Furthermore, displaying of only one image makes it possible to downsize the display unit 118 and this contributes to downsizing of the camera. While the image is displayed, in Step S1028, the plurality of taken images stored in the image storing circuit 113 are successively readout.

The processes from Step S1028 to Step S1033 are sections of electronic operations which make apparent exposure proper by synthesizing the images obtained through a plurality of image-taking operation (images stored in Step S1022) while conforming their characteristic points.

In Step S1029, the characteristic points in the respective images are extracted. In the next Step S1030, the coordinate conversion circuit 115 converts the coordinates of the images (the second image group) on the basis of the coordinates of extracted characteristic points. Herein, only the first image (the first image taken by using the illumination unit 16a) is not subjected to coordinate conversion processing. Namely, the first image is used as a reference image for coordinate conversion processing. In the subsequent Step S1031, the process waits while circulating Steps S1028 through S1031 until the coordinate conversion processing of all the images is finished, and when the coordinate conversion processing of all the images is finished, the process advances to Step S1032.

When the process advances to Step S1032, the first image and the images of the second image group that have been subjected to coordinate conversion processing are synthesized. Herein, image synthesis processing is carried out by averaging of the signals of the coordinates corresponding to each of the images, and random noise in the images is reduced through averaging. Then, the gain of the image with the reduced noise is increased to make the exposure proper. In the next Step S1033, the first image correcting circuit 117a applies gamma correction processing and compression processing to the image data, and furthermore, cuts the end deficient portions of the images produced when the images are synthesized, and complements the reduction in image size by spreading. Namely, the region 129 in which the images do not conform each other in FIG. 5 is cut, and only the region in which the images conform each other is extracted and compensated by spreading.

Thereafter, the process advances to Step S1017, and image data obtained in Step S1021 is recorded on the recording circuit 119 and a recording medium that consists of a semiconductor memory, and can be attached to and detached from the camera, and the process returns to Step S1002.

Furthermore, when the release operation member 12c is still continuously depressed halfway and the sw1 is still on after Step S1017, the process advances in the flow in sequence again, to Steps S1002, S1003, S1004, and S1005.

Furthermore, in the case where the half-depression of the release operation member 12c has been released, the process returns from Step S1002 to Step S1001, and elements of the camera are reset to their initial statuses.

Furthermore, when the release operation member 12c is fully depressed and the sw2 is on in Step S1017, the process does not return to start, but waits in Step S1017. That is, the process does not change into the next image-taking.

Thus, when the correction range 11l of the correcting optical unit 11d is exceeded, by cooperative operation of the optical vibration control and electronic vibration control by synthesizing images, the correcting optical unit 11d can be downsized.

Normally, when the correcting optical unit is designed, the correction range 11l is set by assuming the maximum vibration that may be applied to the camera during exposure. When the correction range 11l of the correcting optical unit is increased, the size of the correcting optical unit significantly increases. The reason for this increase is that the correction range 11l is required to have an extent around the center (initial position) corresponding to vibrations vibrating around the center, and accordingly, a driving space that has twice the area of the correction range 11l becomes necessary, and as the correction range 11l increases, the energy required for driving increases, and the size of the driving part is accordingly increased. However, the excessive increase in the size of the optical vibration control system for the purpose of coping with a great vibration that rarely occurs is not desirable and especially deteriorates the portability of the camera.

As in this embodiment, by employing the cooperative operation with the electronic vibration control system (coordinate conversion processing and synthesis processing of images) according to the amount of correction of the correcting optical unit 11*d*, the correcting optical unit can be made small, thereby realizing a camera easy to use. Conversely, even a small-sized correcting optical unit can cope with a great vibration, and even with a conventional large correcting optical unit, greater vibration can be corrected, whereby the vibration control effect is increased.

Furthermore, as seen in the flowchart of FIG. 6, in the stage of object observation from Step S1002 to Step S1006, that is, when a photographer aims an object to be taken by looking at the monitor (electronic view finder) or finder (optical view finder), the correcting optical unit 11*d* operates on the basis of the signals of the vibration detection sensor 11*f*. This not only reduces the influence of vibration and makes aiming easier, but also improves focusing accuracy. In this stage of object observation, when the correction range 11*l* of the correcting optical unit 11*d* is nearly exceeded, image-taking operation is interrupted, the correcting optical unit 11*d* is returned to its initial position and the image reading out position is displaced (by the arrow 11*r* of FIG. 2). Then, until a next great vibration is applied, the correcting optical unit 11*d* is driven without changing this image reading out position, the system can thereby cope with great vibrations. However, with this structure, there is a possibility that the image reading out position greatly deviates until the end of the stage of object observation, and in the stage of image recording (in the stage of real image-taking operation from Step S1007 to Step S1011), image-taking operation with full-screen becomes impossible. Conversely, for carrying out image-taking operation while effectively using the image plane area in the stage of image recording, a photographer can more stably hold the camera by being informed of composition changes caused by a great vibration in the stage of object observation.

For this reason, in this embodiment, in the stage of object observation, only the optical vibration control is carried out, and in the stage of image recording, image reading out (coordinate conversion) and synthesis processings are carried out in addition to the optical vibration control to realize vibration control with high accuracy.

Furthermore, in this embodiment, usability after finishing image-taking operation is also considered, and when the image is replayed after image-taking operation is finished, the plurality of images to be synthesized are prevented from being replayed (displayed), whereby image browsing is smoothly carried out. Furthermore, at the time of this playback, a sufficient period of time has elapsed until image synthesis is completed, so that the image after being synthesized processing is displayed. Immediately after image-taking operation, one of the plurality of images before being synthesized is displayed. Then, a specified one image among the plurality of images to be synthesized, that is, the image taken by using the illumination unit 16*a* is allowed to be displayed for comparison with the synthesized image. Only the specified one image is displayed, so that the display unit 118 can be downsized, and this contributes to downsizing of the camera.

In the above-described embodiment, the matter that the vibration control effect is improved by cooperative operation of the optical vibration control system and the electronic vibration control system is noted, and furthermore, these vibration control system are used in a balanced manner, whereby the correcting optical unit is significantly downsized.

Embodiment 2

Next, the camera according to Embodiment 2 of the invention is described. First, the differences from the above-described Embodiment 1 are described below.

1) Coordinate conversion processing and synthesis processing of images obtained through re-image-taking operation are carried out simultaneously with image-taking operation. Namely, during the period of the initial position returning operation of the correcting optical unit 11*d*, image processing (coordinate conversion processing and synthesis processing) is carried out.

2) In a case where re-image-taking operation is carried out, the taken and synthesized image is displayed on the monitor on the back face of the camera.

In the flow of Embodiment 1 shown in FIGS. 6A and 6B, after all the images are taken, the images are read out from the image storing circuit 113, subjected to coordinate conversion processing, and synthesized. Here, when the operation of the correcting optical unit 11*d* nearly exceeds the correction range 11*l* and re-image-taking operation is carried out, the operation to move the correcting optical unit 11*d* (the correcting lens 11*b*) to its initial position (Steps S1023 and S1024 of FIG. 6A) is required. During this operation, it is possible that coordinate conversion processing is carried out so that the characteristic point in the image readout from the image pickup element 19*a* conforms the characteristic point in the prior image and the images are synthesized. In this case, at the end of image-taking, image synthesis processing is finished, so that the image after being synthesized can be immediately displayed on the display unit 118 such as the back face monitor of the camera.

FIG. 7 is a timing chart describing the structure in which the image coordinate conversion processing and synthesis processing are carried out simultaneously with current image-taking operation. In response to the exposure operation f1 through f4 (f1 is exposure operation by using the illumination unit 16*a*), signal photoelectrically converted by the image pickup element 19*a* are readout as image signal, and simultaneously with reading out of the image signal F2, correlation of the previous image signal F1 and the current image signal F2 is calculated to determine a characteristic point variation, and the two image signals F1 and F2 are synthesized to obtain a synthesized image signal C2.

Next, simultaneously with reading out of the image signal F3, correlation of the previous synthesized image signal C2 and the current image signal F3 is calculated to determine a characteristic point variation, and the two image signals C2 and F3 are synthesized to obtain a synthesized image signal C3. Then, simultaneously with reading out of the image signal F4, correlation of the previous synthesized image signal C3 and the current image signal F4 is calculated to determine a characteristic point variation, and the two image signals C3 and F4 are synthesized to obtain a synthesized image signal C4. Then, the calculated synthesized image signal C4 is displayed on the liquid crystal display on the camera back face and the synthesized image signal C4 is recorded on a recording medium.

Figure 8A:
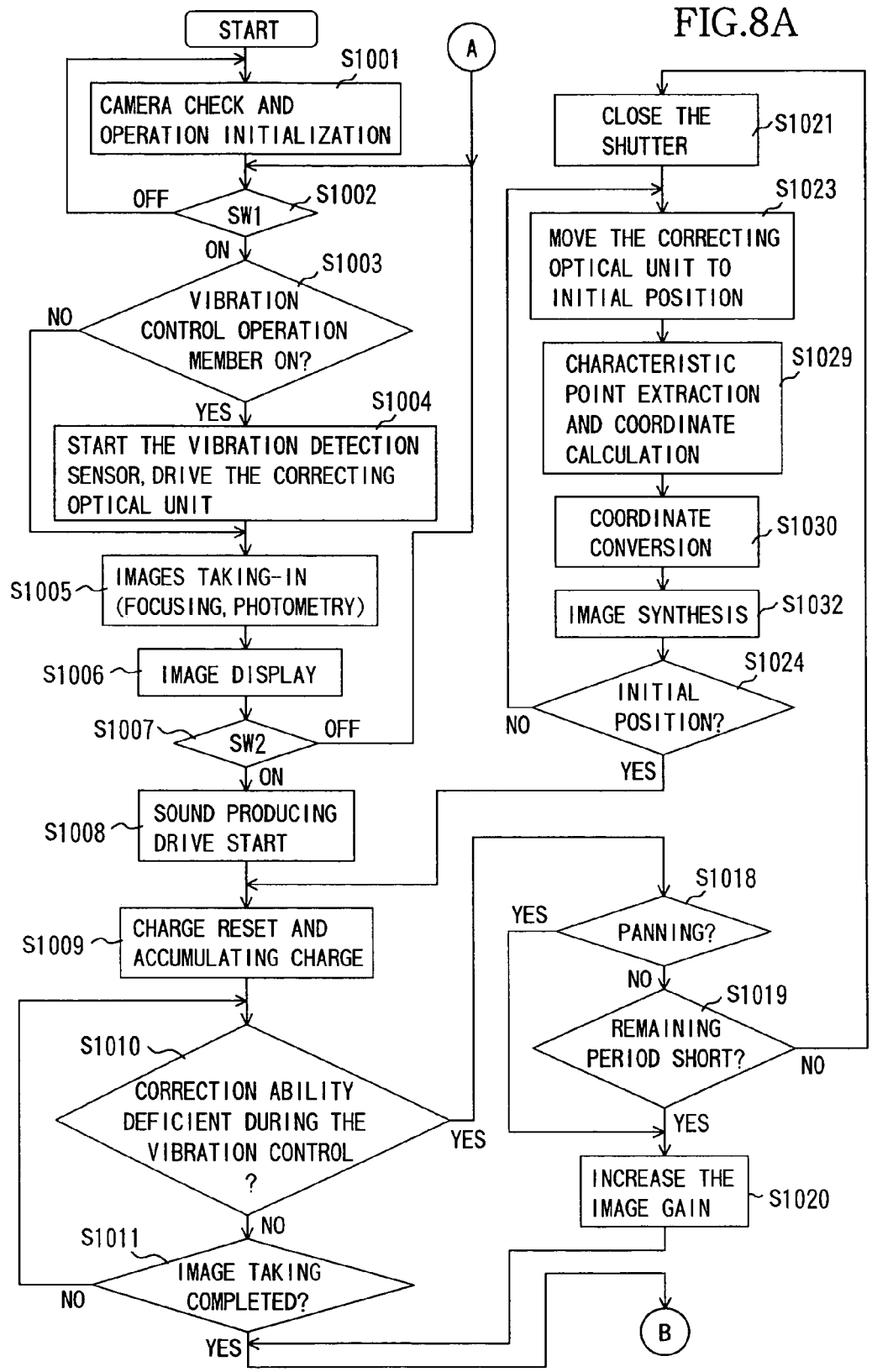
FIGS. 8A and 8B are flowcharts showing image-taking operations in Embodiment 2 of the invention.
Figure 8B:
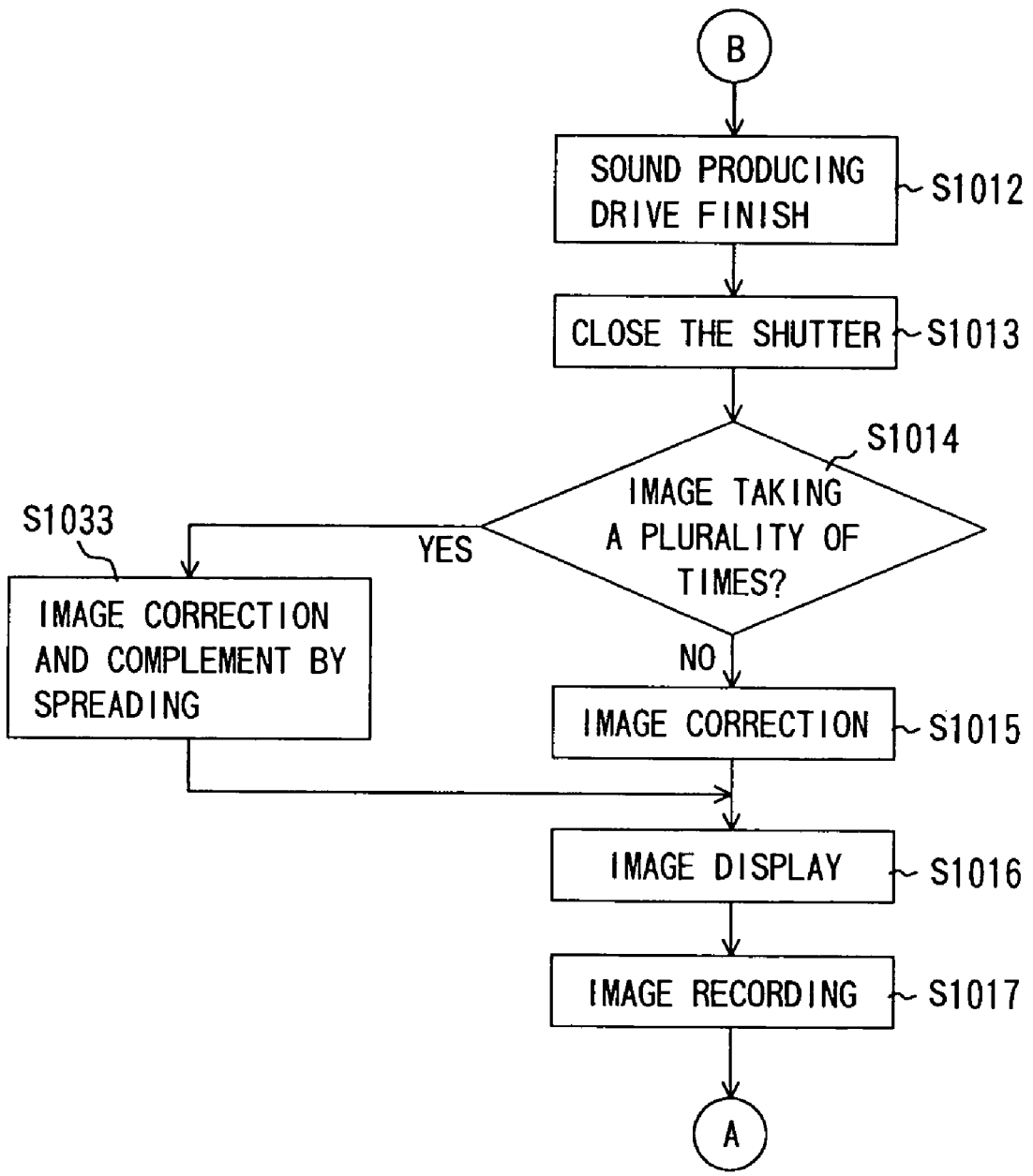

FIGS. 8A and 8B are flowcharts describing the operations mentioned above, and image storing of Step S1022 in the flowchart of FIG. 6A is omitted. In Step S1023, after the operation of moving the correcting optical unit 11*d* to its initial position is started, in the processing of Steps S1029 through S1032, the images are synthesized.

The reason for omitting the image storing processing of Step S1022 is that, in Embodiment 2 of the invention, since each taken image is synthesized with the previous taken image simultaneously with image-taking, only one synthesized image is sufficient to be stored at the point of Step S1032 of image synthesis processing, and other taken images are not necessary. Namely, the synthesized image is renewed every image-taking operation, so that it is not necessary to store the taken images. Therefore, the image storing circuit 113 shown in FIG. 1 becomes unnecessary.

The details of the flowchart are described below. The flow of FIGS. 8A and 8B starts when the power source of the camera is turned on.

In Step S1001, camera checking is carried out and various functions are initialized. Concretely, the power source status and the communications status are checked, and when the results of checking are not suitable for image-taking operation, processing such as indication is carried out. Furthermore, initialization including initialization of pulse encoders to be used for focusing control and initialization of vibration control operation (resetting) are carried out. In the next Step S1002, the process waits until the sw1 is turned on in response to half-depression of the release operation member 12*c* by a photographer, and until the sw1 is turned on, the process returns to Step S1001 and continues camera checking and initialization. Then, when the sw1 is turned on, the process advances to Step S1003.

In Step S1003, it is determined whether or not the photographer has turned the vibration control operation member 120 on, and when it is on, the process advances to Step S1004, the vibration detection sensor 11*f* is started, and the output thereof is processed by the image-taking control circuit 18 and the driving of the correcting optical unit 11*d* is started by the image blurring correcting circuit 11*e*. On the other hand, when the vibration control operation member 120 is off, the process advances to Step S1005 by skipping Step S1004. Therefore, in this case, the vibration detection sensor 11*f* is not started, and the correcting optical unit 11*d* is not driven, either.

In Step S1005, image is taken by using the image pickup element 19*a*. The image-taking control circuit 18 drives the AF drive motor 14*a* by the focusing drive circuit 14*b* to move the image-taking lens 11*a* in the optical axis L direction while detecting the contrast of the image on the basis of the output from the signal processing circuit 111. Then, when the contrast becomes highest, the driving of the image-taking lens 11*a* is stopped to obtain a focused status of the image-taking optical system (AF by means of a hill-climbing method). It is also possible that focusing is carried out by using the phase difference detection method. The image-taking control circuit 18 calculates the brightness of the object on the basis of the output of the image pickup element 19*a*, simultaneously. According to the image-taking conditions, an image-taking exposure period is determined.

The image-taking conditions mentioned herein include the following four items.

Brightness of the object
Focal length of the image-taking optical system
Brightness of the image-taking optical system (f-number)
Sensitivity of the image pickup element For example, it is assumed that the sensitivity of the image pickup element 19*a* has been set to ISO speed 200. The brightness of an object is measured (photometry), and in order to carry out proper exposure on the basis of the results of this photometry, the stop 13*a* is fully opened (for example, f2.8) and the closing timing of the shutter 12*a*, that is, the exposure period is set to ⅛ seconds.

In Step S1006, the image taken in Step S1005 is displayed on the external liquid crystal monitor (display unit 118) of the camera. Then, in the next Step S1007, the process waits while circulating Steps S1002 through S1007 until the sw2 is turned on in response to full-depression of the release operation member 12*c*. Then, when the sw2 is turned on, the process advances to Step S1008.

In Step S1008, by driving the speaker 17*a* via the sound producing drive circuit 17*b*, a sound informing the start of image-taking operation is produced. This sound may be, for example, an electronic bleep sound, a shutter opening sound, or a mirror rising sound. In the next Step S1009, charges that have been accumulated in the image pickup element 19*a* are all reset, and change storage operation is started again. Thereby, real exposure is started.

When the vibration control operates, and a deficient of correction ability is detected during exposure in Step S1010. More concretely, when the operation of the correcting optical unit 11*d* nearly exceeds the correction range during exposure (timing 11*k* of the waveform 11*p* of FIG. 2), the process advances to Step S1018, and otherwise the process advances to Step S1011.

Herein, the reason for using the expression "correction ability" is that, when the correcting optical unit 11*d* cannot sufficiently correct image blurring, not only is the correction range 11*l* deficient, but also there is a possibility that the vibration speed is high and the correcting optical unit 11*d* cannot follow the speed. For detection of the correction range 11*l*, a position detector is provided in the correcting optical unit 11*d* and the correcting position is always monitored, or the image blurring correction target value to be supplied to the correcting optical unit 11*d* is monitored. Detection of the vibration speed may be made by, for example, the derivative value of the image blurring target value. When the correction range 11*l* is not exceeded, the process advances to Step S1011 as described above.

In Step S1011, it is determined whether or not the exposure period has completely elapsed, and when the exposure period elapses, the process advances to Step S1012, and otherwise the process returns to Step S1010 and circulates this flow while checking the correction ability of the correcting optical unit until exposure is completed.

When the correcting optical unit 11*d* nearly exceeds the vibration correction range 11*l* in Step S1010 during exposure, it is determined in Step S1018 whether or not the camera is being panned as described above. Concretely, when a great angular velocity is added to the camera for a predetermined period of time during exposure depending on the output of the vibration detection sensor 11*f*, it is determined that the camera is being panned. Actual panning detection is not started in Step S1018, but is started prior to Step S1018. When it is determined in Step S1018 that the camera is being panned, the process advances to Step S1020, and when it is determined that panning is not being carried out, the process advances to Step S1019. When the camera mode is set to rear-curtain flash sync, since the illumination unit has not emitted light, exposure must be continued. Therefore, in the case of the rear-curtain flash sync mode, the process advances to Step S1019 without condition.

In Step S1019, it is determined whether or not exposure is started again according to the ratio of the remaining time until the end of exposure to the total exposure period, and for example, when the ratio of the remaining exposure period to the total exposure period is less than ⅓, the process advances to Step S1020, and otherwise the process advances to Step S1021. When the camera mode is set to rear-curtain flash sync, the illumination unit has not emitted light, so that the exposure must be continued. Therefore, in the case of the rear-curtain flash sync mode, the process advances to Step S1021 without condition.

When the process advances to Step S1020, the gain of the image is increased according to the omission of the remaining exposure period, and the process advances to Step S1012.

When the remaining exposure period is long and re-image-taking operation is necessary in Step S1019, the process advances to Step S1021, and herein, the shutter 12a is closed and charges accumulated in the image pickup element 19 are transferred to the signal processing circuit 111. Then, when this transfer is finished, the shutter 12a is opened. In the subsequent Step S1023, the correcting optical unit 11d starts moving to its initial position. In addition, simultaneously with this, the shutter 12a is opened and the image of a light flux from the object is formed on the image pickup element 19a.

The Steps S1029 through S1032 are sections of electronic correcting operations which make the apparent exposure proper by synthesizing images obtained through re-image-taking operation (images readout in Step S1021) while conforming their characteristic points.

In Step S1029, characteristic point extraction from the image readout in Step S1021 is started. In the next Step S1030, the coordinates of the extracted characteristic point is compared with the coordinates of the characteristic point in the image previously taken, and the coordinate conversion circuit 115 starts coordinate conversion processing for the readout image so that the coordinates thereof match those of the previous image. Herein, only the first image (the first image taken by using the illumination unit 16a) is not subjected to coordinate conversion processing. Namely, this first image is used as a reference image for coordinate conversion processing. In the next Step S1032, synthesis processing of the image obtained by synthesizing the images previously taken and the image that has been readout and subjected to coordinate conversion processing at this time is started. Herein, image synthesis processing is carried out by averaging the signals of the coordinates corresponding to each other in the images, and random noise in the images is reduced through averaging processing. Then, the gain of the image with reduced noise is increased to make exposure proper.

In the next Step S1024, the process waits while circulating Steps S1023 and S1024 until the correcting optical unit 11d operates at its initial position. Then, when the correcting optical unit 11d (the correcting lens 11b) moves at its initial position, the process returns to Step S1009 and exposure is started again.

When the correcting optical unit 11d is returned to its initial position as described above, the calculation load on the image-taking control circuit 18 is small, so that the operation of Step S1029 through Step S1032 can be carried out a high rate, and the originally required initialization period of the correcting optical unit 11d can be effectively used. The operations of Step S1029 through Step S1032 only command the operation start in each step, and do not include transition to the next operation from the end of each operation. Namely, even when the process advances from Step S1024 to Step S1009 and re-image-taking operation is started, operations of Step S1029 through Step S1032 can be carried out simultaneously until the process advances to Step S1021 from Step S1009.

As described above, when the correcting optical unit 11d nearly exceeds the correction range 11l during exposure, the image-taking data obtained until this point is readout, image-taking operation is started again, and simultaneously, synthesis processing with the previous image is carried out. However, when the remaining exposure period is short or panning is carried out, re-image-taking operation is not carried out.

This is for giving priority to the mobility of the camera and for repressing lowering in reliability of background image synthesis.

Thereafter, when the process advances to Step S1012, by driving the speaker 17a via the sound producing drive circuit 17b, a sound informing the completion of image-taking operation is produced. This sound may be an electronic bleep sound which is different from the electronic bleep sound in Step S1008, a shutter closing sound, or a mirror lowering sound. Thus, in the case where image-taking operation is carried out a plurality of times, sounds informing the operations are one set of sounds (each produced once when starting exposure of the first image-taking operation and when completing the exposure of the last image-taking operation), and therefore, the sounds do not give a photographer discomfort even when image-taking operation is carried out a plurality of times. Namely, the number of sounds to be produced is equal in the case of normal image-taking operation (one exposure) and the plurality of times of image-taking operations, and this represses the photographer from feeling discomfort when taking images.

In the next Step S1013, the shutter 12a is closed so as to block light reaching the image pickup element 19a, and then charges in the image pickup element 19a are transferred to the signal processing circuit 111 via the A/D converter 110. Thereafter, the correcting optical unit 11d is returned to its initial position for preparation for the next image-taking operation, and when the charge transfer is finished, the shutter 12a is opened. In the next Step S1014, it is determined whether or not image-taking operation has been carried out a plurality of times due to the movement of the correcting optical unit 11d exceeding the correction range 11l during exposure when the vibration system operates, and when image-taking operation is carried out only one time, the process advances to Step S1015, and when image-taking operation is carried out two or more times, the process advances to Step S1033.

When the process advances to Step S1015, the second image correcting circuit 117b applies gamma correction processing and compression processing to input signals. In the next Step S1016, the output signals of the second image correcting circuit 117b are input into and displayed on the display unit 118 provided on the back face of the camera. In Step S1017, the output signals of the second image correcting circuit 117 are input into the recording circuit 119. Then, the process returns to Step S1002.

On the other hand, when the process advances to Step S1033 since it is determined that image-taking operation has been carried out a plurality of times in Step S1014, the first image correcting circuit 117a applies gamma correction processing and compression processing to the image data, and furthermore, cuts the end deficient portions of the respective images produced when being synthesized and complements the reduction in image by spreading. Namely, the region 129 in which the images do not conform in FIG. 5 is cut, and only the region in which the images conform each other is extracted and subjected to complement by spreading. Then, in the next Step S1016, the signal of the first image correcting circuit 117a is input into and displayed on the display unit 118 provided on the back face of the camera. In the next Step S1017, the image data produced in Step S1021 is recorded on a recording medium (recording circuit 119) which consists of a semiconductor memory, and can be attached to and detached from the camera. Then, the process returns to Step S1002.

When the release operation member 12c is still continuously depressed halfway and the sw1 is still on after Step S1017, the process advances in the flow in sequence again, to Steps S1002, S1003, S1004, and S1005.

On the other hand, when the half-depression of the release operation member 12c is released, the process returns from Step S1002 to Step S1001, and the elements of the camera are reset to their initial statuses. Furthermore, when the release operation member 12c is fully depressed and the sw2 is on in Step S1017, the process does not return to start but waits in Step S1017.

In Embodiment 2 of the invention, image synthesis processing is carried out simultaneously with image-taking operation by effectively using the period during which the correcting optical unit 11d is returned to its initial position. During this period, the calculation load on the camera is small, so that image coordinate conversion processing and synthesis processing can be carried out at a high rate. Thus, by carrying out image synthesis processing simultaneously with image-taking operation, the storage section that stores the plurality of images can be made unnecessary. In addition, this provides an advantage in that the actual synthesized image can be confirmed when image-taking operation is finished.

Embodiment 3

Next, Embodiment 3 of the invention is described. First, the differences from Embodiment 1 given above are described.

1) When the correcting optical unit 11d nearly exceeds the correction range 11l, the correcting optical unit 11d is fixed at this position. Then, the image-taking operation is temporarily stopped and re-image-taking operation is carried out in the same manner as in Embodiment 1, and at this point, the correcting optical unit 11d is not operated, and instead, image-taking operation is carried out with an exposure period that does not cause image blurring, and if the total exposure period is deficient, image-taking operation is repeated again. When the interval of continuous shooting is short, the period during which the correcting optical unit 11d is returned to its initial position becomes a problem, however, high-speed continuous shooting is made possible by the above-described structure.

2) The obtained plurality of images are not synthesized within the camera, but are synthesized by using an external apparatus such as a personal computer after they are taken. Thereby, the camera calculation time is reduced so as to repress the right moment of releasing the shutter from being lost.

3) In the stage of object observation, vibration control is carried out by means of reading out of the images. Thereby, even in the stage of image recording, sufficient allowance is obtained in the correction range 11l of the correcting optical unit 11d, and electric power saving can be realized in the stage of object observation.

As described above, Embodiment 3 of the invention realizes high-speed image-taking operation, which improves high-speed continuous shooting and image-taking mobility.

The reason why the driving of the correcting optical unit 11d is stopped during re-image-taking operation is that, when the re-image-taking operation is increased in speed by omitting the period of returning the correcting optical unit 11d to its initial position, the correcting optical unit 11d is not positioned at its initial position when starting re-image-taking operation, and the driving of the correcting optical unit 11d is not necessary (exceeds the correcting range 11l soon). Then, the correcting optical unit 11d is fixed at the position where it is positioned at the end of the first image-taking operation and waits there until all image-taking operations are finished. The reason for this is that image blurring is caused if the correcting optical unit 11d is returned to its initial position during image-taking operation.

As described above, during re-image-taking operation, the correcting optical unit 11 is not driven for image blurring correction, so that the exposure period must be shortened so as not to cause image blurring.

Image deterioration due to vibration is determined by the magnitude of the vibration, the focal length of the image-taking optical system and the exposure period when taking the image. Generally, in the case of an image size of 135 format, when image-taking operation is carried out with the exposure period equal to one over the focal length (for example, 1/300 when the focal length is 300 mm), image blurring does not greatly stand out even in normal size printing. Therefore, when the conditions require re-image-taking operation, image-taking operation is carried out for the exposure period determined as mentioned above, and when image-taking operation for a longer period is required, image-taking operation is stopped again, and image-taking operation is carried out again.

Image-taking operation is thus repeated a plurality of times with a short exposure period, and the plurality of obtained images are synthesized while conforming their characteristic points to improve exposure.

As described above, in Embodiment 3, the processing of conforming the characteristic points and synthesis operation are not performed in the camera, but performed with a personal computer by using application software supplied with the camera after the image-taking operation. In this case, the following method is used for making this processing easier.

The taken images are recorded on a recording medium (recording circuit 119) that consists of a semiconductor memory or the like and can be attached to and detached from the camera. Among the recorded images, an image obtained by normal image-taking operation, that is, an image obtained by one image-taking operation without setting the vibration control mode, an image obtained by one image-taking operation even in the vibration control mode since the correcting optical unit 11d is driven within the correction range 11l and image-taking operation is not repeated a plurality of times, and images obtained through a plurality of times of image-taking operations, are mixed. Selection of images obtained through a plurality of times of image-taking operations from these images becomes remarkably troublesome as the number of recorded images increases.

Therefore, in this embodiment, the images taken in a plurality of times are recorded so as to be identified in the recording circuit 119. The application software supplied with the camera recognizes the identification information and extracts only the images taken in a plurality of times and automatically synthesizes the plurality of images by conforming the positions. The synthesized image is recorded again on the recording circuit 119, and the plurality of images that have been recorded on the recording circuit 119 are erased. Thereby, space is created in the recording capacity of the recording circuit 119.

Furthermore, in Embodiment 3, in the stage of object observation, optical vibration control by driving the correcting optical unit 11d is not carried out. This is for effectively using the correction range 11l by setting the correcting optical unit 11d at the initial position when starting image-taking operation. If the correcting optical unit 11d is driven in the stage of object observation, when image-taking operation is started, the correcting optical unit 11d may be positioned close to the limit of correction range 11l for image blurring correction. In this case, re-image-taking operation may be carried out immediately after starting image-taking operation.

In Embodiment 3 the object of which is to improve the continuous shooting speed, it is desired to reduce as much as possible the occasion for change into re-image-taking, so that the correcting optical unit 11d is stopped at its initial position until image-taking operation is started. Alternatively, on the basis of motion vector information obtained from the images and information of the vibration detection sensor 11f, image information is displayed on the back face monitor (display unit 118) of the camera by changing the position of extracting the image information from the image pickup element 19a for each frame, whereby image blurring correction processing is carried out. In this case, there is a possibility that the position of extracting also deviates when starting image-taking operation. Therefore, the extraction region may be limited. However, image extraction processing is not carried out when starting image-taking operation, that is, in actuality, the region in which the images obtained through re-image-taking operation and the synthesized image do not conform each other is cut, so that the extraction position limitation does not reduce the image blurring correction amount. In addition, in the stage of object observation, the correcting optical unit 11d is not driven, and this reduces the power consumption.

Figure 9:
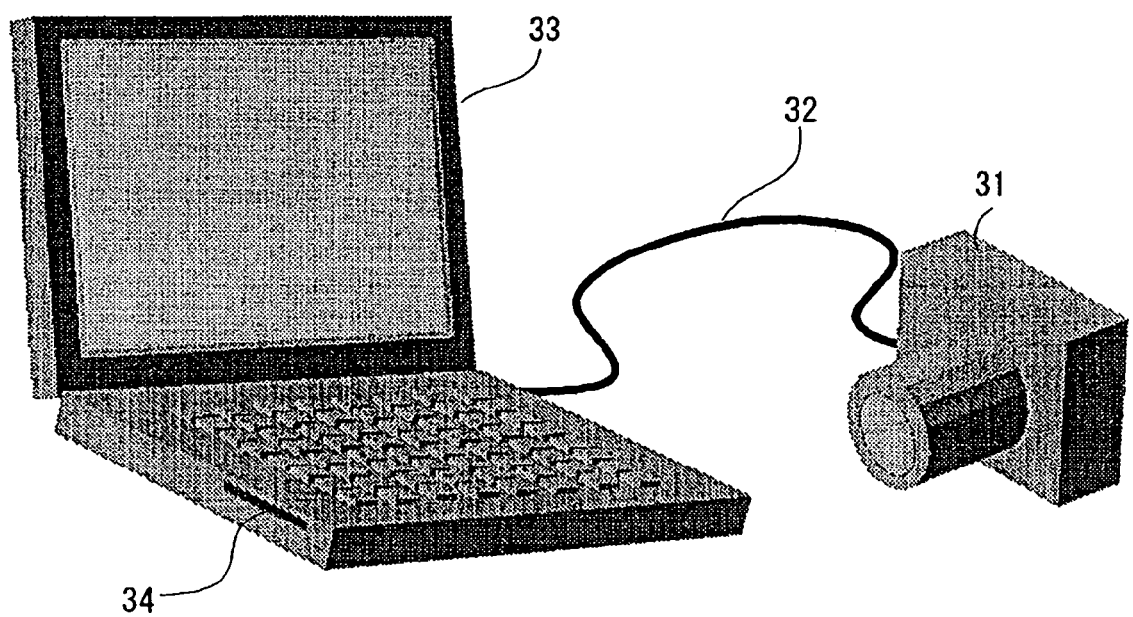
FIG. 9 is a diagram showing a connection state of a personal computer and a camera in Embodiment 3 of the invention.

FIG. 9 is a connection view of the personal computer and the camera, wherein the digital camera 31 is cable-connected by using a USB cable 32 to the notebook computer 33. By this connection, the image data in the digital camera 31 can be transmitted to the notebook computer 33. It is also possible that, for data control, in place of cable connection using the USB cable, a recording medium (a recording circuit 119) attached to the digital camera 31 is detached from the camera main body and inserted into a slot 34 formed in the notebook computer 33.

In the notebook computer 33, application software relating to this embodiment is installed in advance. Operations of this application software are described below.

1) From images recorded on the recording circuit 119 of the digital camera 31, a plurality of images recorded for image synthesis processing are identified and automatically taken into the notebook computer 33. At this point, since the image data are moved, the images to be synthesized in the recording circuit 119 are erased.

2) In the notebook computer 33, deviations among the images taken by continuous shooting are corrected by means of coordinate conversion processing and synthesized to improve exposure.

3) The synthesized image is subjected to gamma correction processing and compression processing, and furthermore, the end deficient portions of the images generated at the point of synthesis processing are cut, and the reduction in image size is compensated by spreading.

4) The synthesized image is returned to the recording circuit 119 again via the cable 32, etc.

These operations are described in detail.

Figure 10:
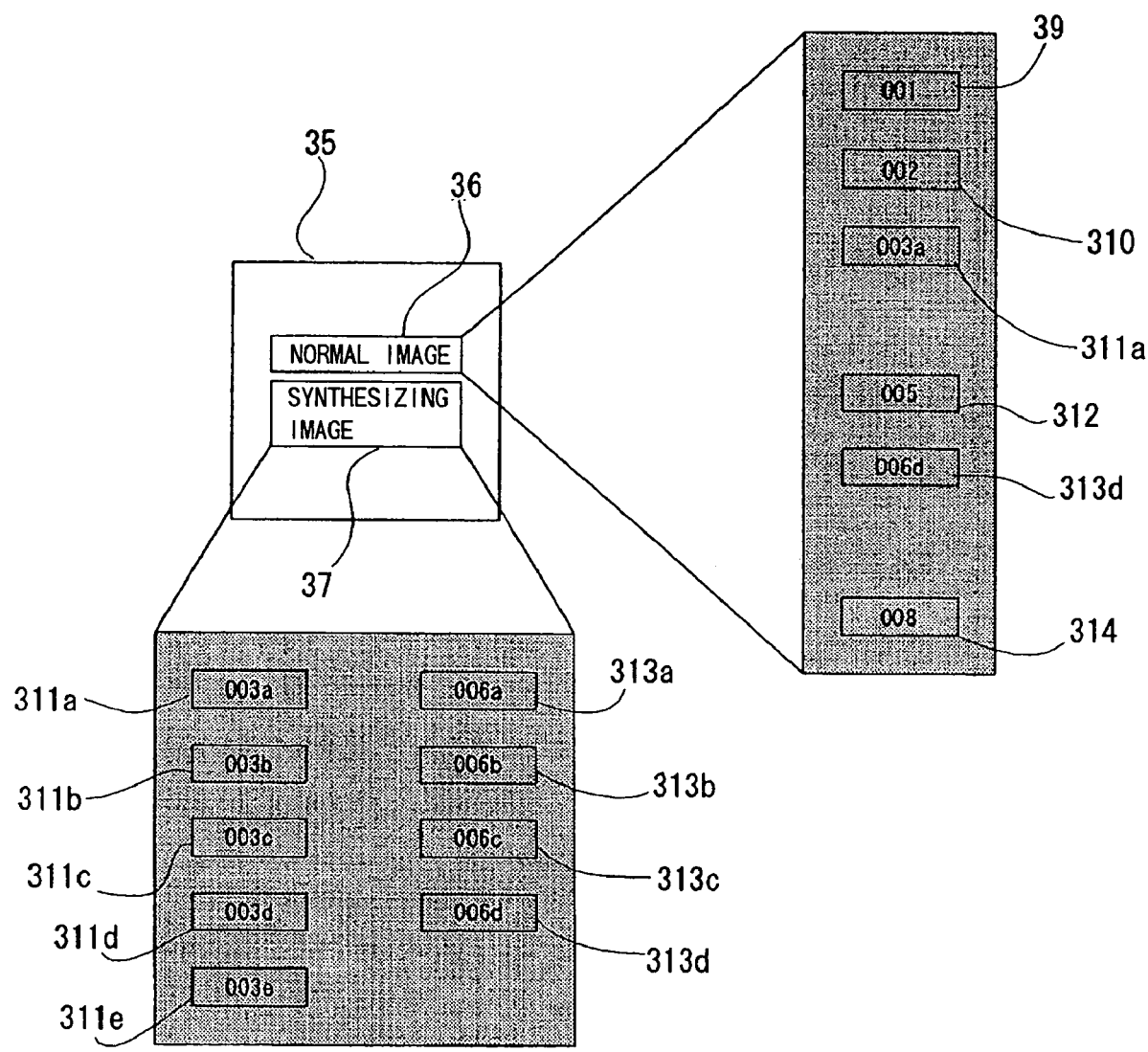
FIG. 10 is a diagram showing a file storing status in Embodiment 3 of the invention.

As shown in FIG. 10, the inside of the folder 35 of the recording circuit 119 inside the camera is divided into two folders including a normal image folder 36 for storing images taken by normal image-taking operation and a synthesizing image folder 37 for storing images to be synthesized continuously taken when the correcting optical unit 11d exceeds the correction range 11l during image-taking operation.

In the normal image folder 36, images 39, 310, 311a, 312, 313d, and 314 are stored in order of image-taking operation. Herein, one image (image taken by using the illumination unit 16a) 311a (003a) among the images to be synthesized continuously taken when the correcting optical unit 11d exceeds the correction range 11l during image-taking operation is also stored in the normal image folder 36. The image number of the image 312 next to the image 311a skips one number (skips 004).

Likewise, the image 313d (006d) is one of the plurality of images taken for synthesis processing, and in this case, image-taking operation is carried out in order from the image 006a, however, rear-curtain flash sync is selected, and the illumination unit 16a is used for the last frame, and therefore, this last frame is stored in the normal image folder 36. In addition, the next image number (007) is skipped.

In the synthesizing image folder 37, all the images taken by continuous shooting for synthesis processing are recorded, and the camera 31 transmits the image data together with the folder 37 into the notebook computer 33. Then, the positions of the images 311a through 311e taken by continuous shooting are conformed.

In this case, the image 311a (003a) taken by using the illumination unit 16a is used as a reference image. Images whose positions have been conformed are synthesized to complement exposure, subjected to gamma correction processing and compression processing, and the end deficient portions of the images generated when the images are synthesized are cut, and the reduction in image size is complemented by spreading, and then the image is temporarily stored in the memory of the notebook computer 33.

Likewise, the images 313a through 313d obtained by continuous shooting are conformed in position. At this point, the image 313d (006d) taken by using the illumination unit 16a is used as a reference image. The images whose positions have been conformed are synthesized to complement exposure, subjected to gamma correction processing and compression processing, and the end deficient portions of the images generated when the images are synthesized are cut, and the reduction in image size is complemented by spreading, and then the image is temporarily stored in the memory of the notebook computer 33.

The images thus recorded in the memory of the notebook computer 33 are collectively transmitted to the recording circuit 119 of the digital camera 31, and are stored in the normal image folder 36 in order of image-taking operation. Namely, no image data is left in the notebook computer 33.

Figure 11:
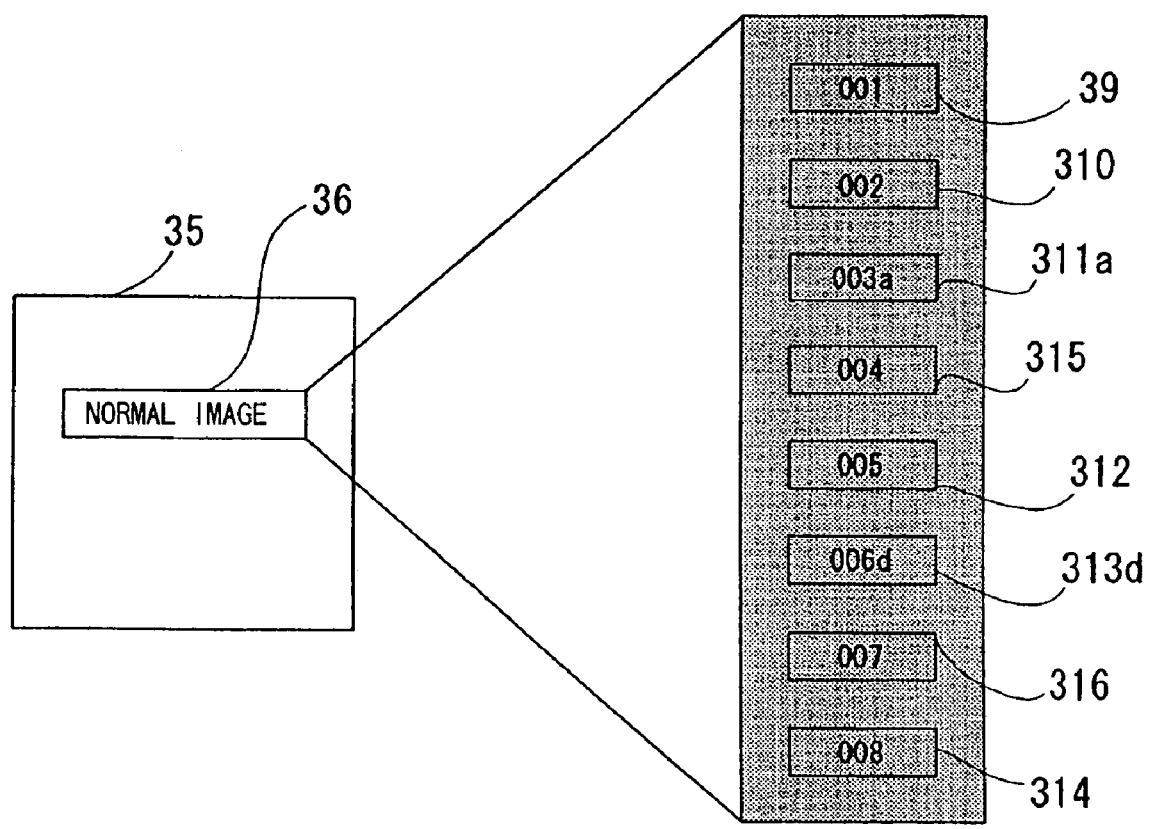
FIG. 11 is a diagram showing a file organizing status in Embodiment 3 of the invention.

In the normal image folder 36 of the recording circuit 119 after the processing mentioned above, images (synthesized images) 315 and 316 are stored next to the images 311a and 313d that have been taken by using the illumination unit 16a and recorded in advance as shown in FIG. 11. Therefore, a photographer can compare the synthesized image and the image that was taken by using the illumination unit 16a and has the same composition although it has not been synthesized, and if either one is not necessary, it can be easily erased.

Figure 12A:
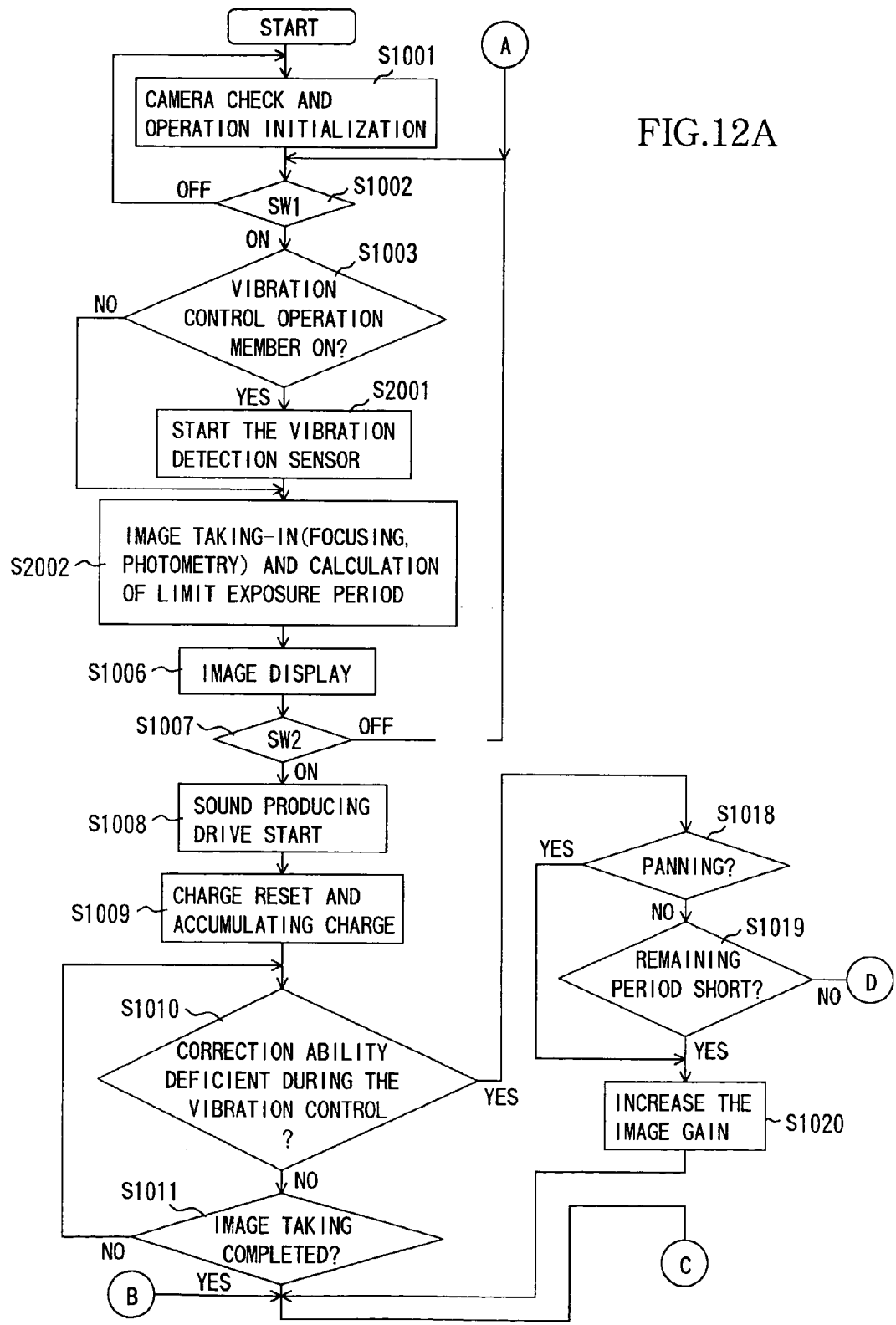
FIGS. 12A to 12C are flowcharts showing image-taking operations in Embodiment 3.
Figure 12B:
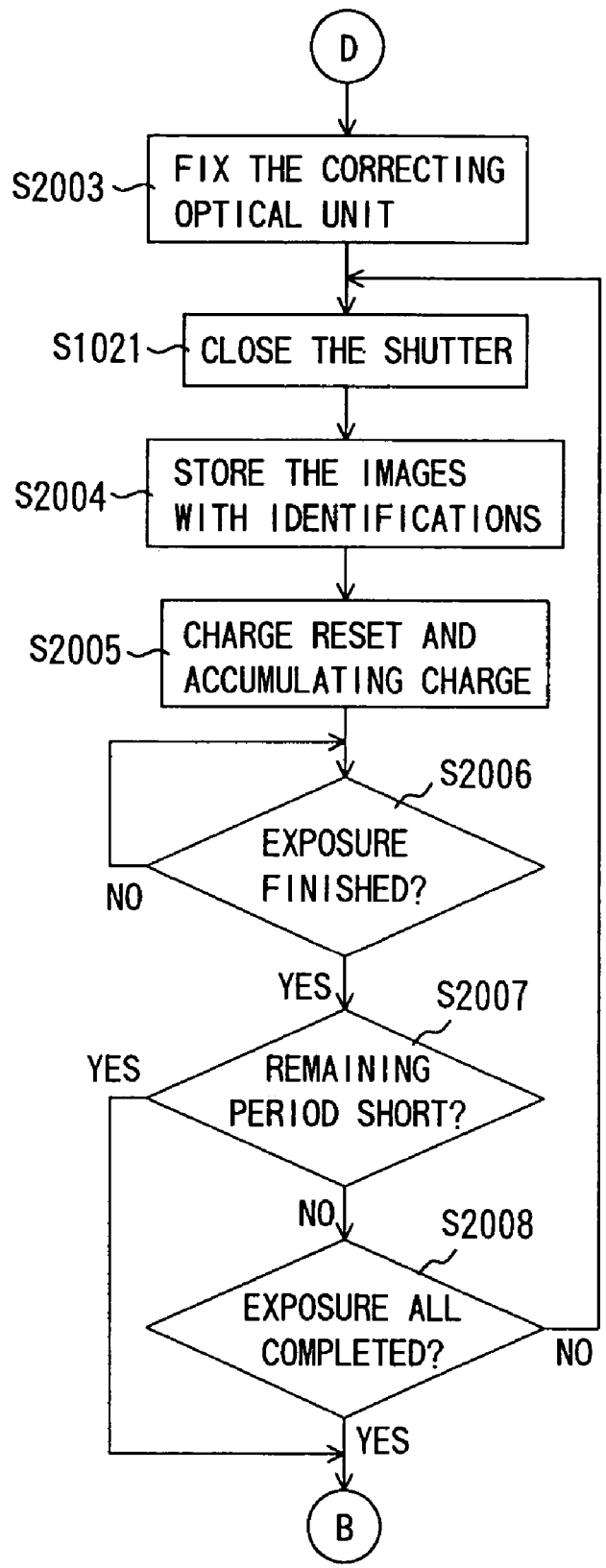
Figure 12C:
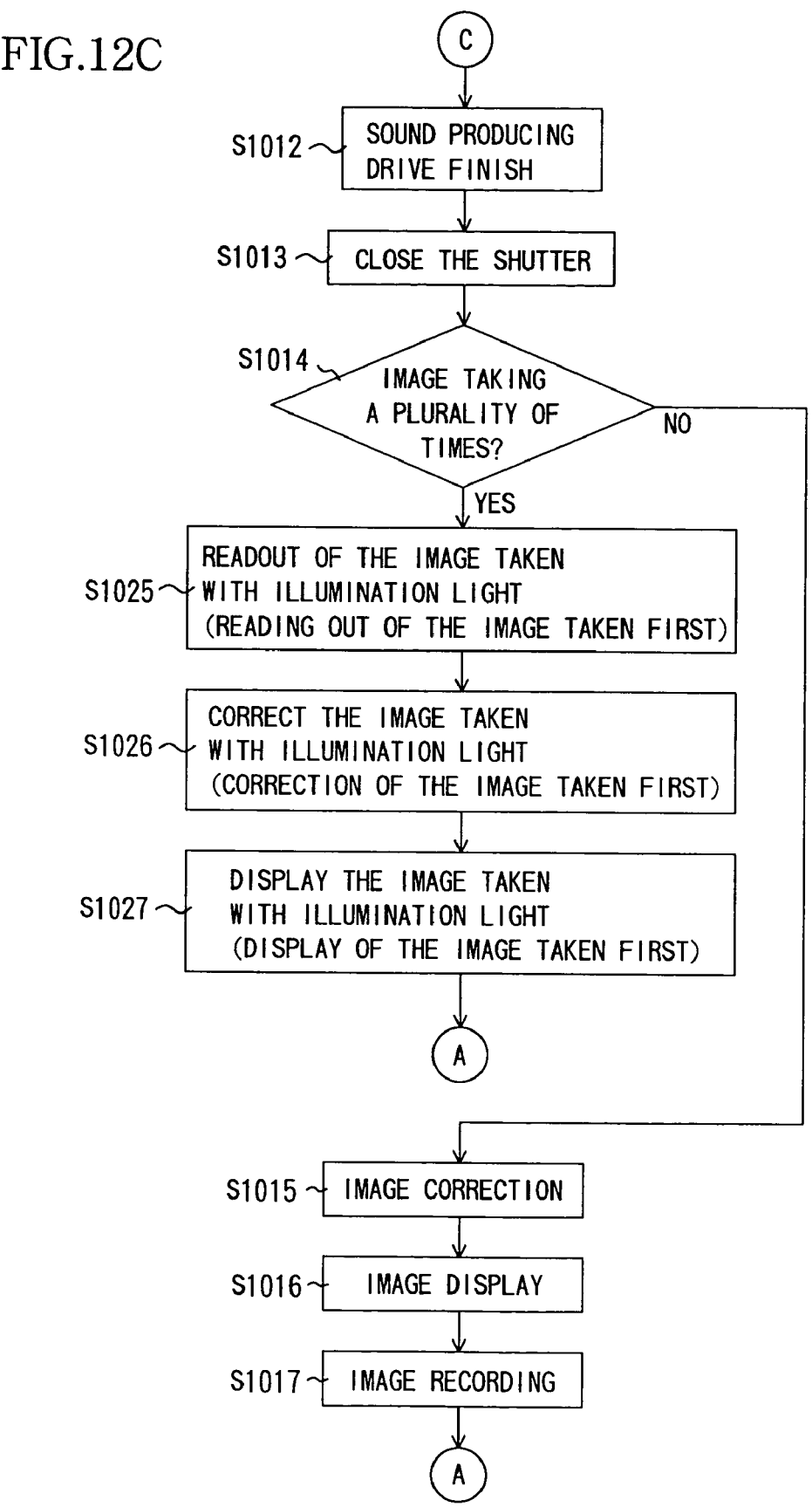

FIGS. 12A to 12C are flowcharts describing the operations of the camera according to this embodiment, and this flow starts when the power source of the camera is turned on.

In Step S1001, camera checking is carried out and various functions are initialized. Concretely, the power source status and the communications status, etc., are checked, and when the results of this checking are not suitable for image-taking operation, processing such as indication is carried out. Furthermore, initializations processing including initialization of pulse encoders to be used for focusing control and vibration control calculation initialization (resetting) are carried out.

In Step S1002, the process waits until the sw1 is turned on in response to half-depression of the release operation member 12c by a photographer, and until the sw1 is turned on, the process returns to Step S1001 and continues camera checking and initialization processing. Then, when the sw1 is turned on, the process advances to Step S1003, and in this step, it is determined whether or not the vibration control operation member 120 has been turned on by the photographer, and when it is on, the process advances to Step S2001 and starts the vibration detection sensor 11*f*. However, this embodiment is different from Embodiments 1 and 2, and the driving of the correcting optical unit 11*d* on the basis of the output of the vibration detection sensor 11*f* is not carried out. On the other hand, when the vibration control operation member 120 is off, the process advances to Step S2002 by skipping Step S2001. In this case, the vibration detection sensor 11*f* is not started.

In the next Step S2002, image is taken by using the image pickup element 19*a*. When reading out the respectively image signals, the reading out start position is changed on the basis of the output of the vibration detection sensor 11*f*. Thereby, displacement among the images which occurs due to vibration can be eliminated. As a matter of course, when Step S2001 is skipped and the vibration detection sensor 11*f* is not driven, the reading out position is not changed. The image-taking control circuit 18 moves the image-taking lens 11*a* in the optical axis L direction by driving the AF drive motor 14*a* via the focusing drive circuit 14*b* while detecting the contrast of the image on the basis of the image signal output from the signal processing circuit 111. Then, when the contrast becomes highest, the driving of the image-taking lens 11*a* is stopped, whereby a focused status of the image-taking optical system is obtained (AF by the hill-climbing method). It is also possible that focusing operation is carried out by using the phase difference detection method. Simultaneously, the image-taking control circuit 18 calculates the brightness of the object on the basis of the output of the image pickup element 19*a*. Then, according to the image-taking operation conditions, the exposure period for image-taking is determined.

The image-taking conditions mentioned herein include the following four items.

Brightness of the object
Focal length of the image-taking optical system
Brightness of the image-taking optical system (f-number)
Sensitivity of the image pickup element For example, it is assumed that the sensitivity of the image pickup element 19*a* is set to ISO speed 200. The brightness of the object is measured (photometry) and in order to obtain proper exposure on the basis of the results of this photometry, the stop 13*a* is fully opened (for example, f2.8) and the closing timing of the shutter 12*a*, that is, the exposure period is set to ⅛ seconds.

Herein, the point of difference from Embodiments 1 and 2 is that a limit exposure period when image-taking operation is carried out without using vibration control is calculated. This means that the exposure period is set to one over the focal length regardless of the brightness of the object, and if exposure becomes insufficient in this case, first, the stop 13*a* is opened as wide as possible. And if exposure is still insufficient even when the stop 13*a* is opened as wide as possible, the sensitivity of the image pickup element 19*a* (gain of the output signals) is increased.

The exposure period, the f-number and the gain of the output signals of the image pickup element 19*a* thus set are not used immediately for subsequent image-taking operation, and these image-taking conditions are set from re-image-taking operation that is started when the correcting optical unit 11*d* nearly exceeds the correction range 11.

In the next Step S1006, the images obtained in Step S2002 are displayed on the external liquid crystal monitor (display unit 118) of the camera. In this case, the images are displayed in a state that displacements among images to be displayed in sequence are repressed by changing the reading out position according to vibration detection signals detected by the vibration detection sensor 11*f*. In the subsequent Step S1007, the process waits while circulating Steps S1002 through S1007 until the sw2 is turned on in response to full-depression of the release operation member 12*c*. Then, when the sw2 is turned on, the process advances to Step S1008.

When the process advances to Step S1008, a sound informing the start of image-taking operation is produced by driving the speaker 17*a* via the sound producing drive circuit 17*b*. This sound may be, for example, an electronic bleep sound, a shutter opening sound, or a mirror rising sound. When the vibration control operation member 120 is turned on, in this step, the optical vibration control is started by driving the correcting optical unit 11*d*. Namely, at the time of start of image-taking operation, the correcting optical unit 11*d* (correcting lens 11*b*) is positioned at its initial position, so that the correction range 11*l* can be effectively used during the exposure period. Also, when the correcting optical unit 11*d* has been driven in the stage of object observation, the correcting optical unit 11*d* is not always positioned at initial position. In the next Step S1009, charges accumulated in the image pickup element 19*a* until this point are all reset, and the operation accumulating charges is started again. Thereby, real exposure is started.

During exposure, in Step S1010, a deficient of correction ability when the vibration control is turned on is detected, that is, in detail, when the movement of the correcting optical unit 11*d* nearly exceeds the correction range 11*l* during exposure (the timing 11*k* of the waveform 11*p* of FIG. 2), the process advances to Step S1018, and otherwise the process advances to Step S1011. Herein, the reason for using the expression "correction ability" is that, when the correcting optical unit 11*d* cannot sufficiently correct image blurring, not only is the correction range 11*l* deficient, but also there is a possibility that the vibration speed is high and the correcting optical unit 11*d* cannot follow the speed. For detection of the correction range 11*l*, a position detector is provided in the correcting optical unit 11*d* and the correcting position is always monitored, or the image blurring correction target value to be supplied to the correcting optical unit 11*d* is monitored. The vibration speed can also be detected, for example, depending on the derivative value of the image blurring correction target value. When the correction range 11*l* is not exceeded, the process advances to Step S1011.

When the process advances to Step S1011, it is determined whether or not the exposure period has elapsed, and when the exposure period elapses, the process advances to Step S1012, and otherwise the process returns to Step S1010 and circulates this flow while checking the correction ability of the correcting optical unit until completion of the exposure.

Furthermore, when the correcting optical unit 11*d* nearly exceeds the vibration correction range 11*l* during exposure in Step S1010, as described above, the process advances to Step S1018, and in this step, it is determined whether or not the camera is being panned. Concretely, when it is determined that a great angular velocity is added to the camera for a predetermined period of time during exposure on the basis of the output of the vibration detection sensor 11*f*, it is determined that the camera is being panned. The actual panning detection is not started in this Step S1018, but is started prior to this step. Then, when it is determined in Step S1018 that the camera is being panned, the process advances to Step S1020, and when it is determined that the camera is not being panned, the process advances to Step S1019. When the camera mode is set to the rear-curtain flash sync, the illumination unit has not emitted light yet, so that the exposure must be continued. Therefore, in the case of the rear-curtain flash sync mode, the process advances to Step S1019 without condition.

In Step S1019, it is determined whether or not exposure is to be started again depending on the ratio of the remaining period until the end of the exposure to the total exposure period, and for example, when the remaining exposure period is less than ⅓ of the total exposure period, the process advances to Step S1020, and otherwise the process advances to Step S1021. When the camera mode is set to rear-curtain flash sync, the illumination unit has not emitted light yet, so that the exposure must be continued. Therefore, in the case of the rear-curtain flash sync mode, the process advances to Step S2003 without condition.

When the process advances to Step S1020, the gain of the image is increased according to the omission of the remaining exposure period, and the process advances to Step S1012.

Furthermore, when the remaining exposure period is long and it is necessary to carry out image-taking operation again, the process advances to Step S2003, and herein, the correcting optical unit 11d is fixed to the current correcting position (the limit position of the correcting range 11l in this case). This fixation operation is carried out by continuously outputting the driving target value of the correcting optical unit 11d corresponding to the current correcting position. Then, in the next Step S1021, the shutter 12a is closed and charges accumulated in the image pickup element 19a are transferred to the signal processing circuit 111. When this transfer is finished, the shutter 12a is opened. In the stage of object observation (Steps S1002 through S1006), according to the signals of the vibration detection sensor 11f, the image reading out position is changed, however, in the stage of image-taking (after Step S1007), the image reading out position is not changed.

In the next Step S2004, the image data produced by the signal processing circuit 111 is stored. The images to be stored in this Step S2004 are uncompleted image data obtained when the correcting optical unit 11d nearly exceeds the correction range 11l during image-taking operation, so that the images are not stored in the normal image folder 36 shown in FIG. 10 in the recording circuit 119, but are stored in the synthesizing image folder 37. However, only the predetermined image (the first image in the case of front-curtain flash sync, and the last image in the case of rear-curtain flash sync when the illumination unit 16a is used, and the first image when image-taking operation is carried out without using the illumination unit 16a) is also stored in the normal image folder 36.

In the subsequent Step S2005, charges accumulated until this point in the image pickup element 19a are all reset, and the operation accumulating charges is started again. Thereby, re-exposure (re-image-taking) can be started. Simultaneously, the shutter 12a is opened so that the image of the light flux from the object is formed on the image pickup element 19a. Then, in the next Step S2006, the process waits until the end of exposure. The end of exposure mentioned herein is the end of the shorter one of the limit exposure period calculated in Step S2002 and the remaining exposure period of current image-taking operation. In the next Step S2007, it is determined whether or not the remaining exposure period is shorter than a predetermined period of time when the front-curtain flash sync is set, and this is the same step as Step S1019. When the remaining exposure period is still long or image-taking operation by using the rear-curtain flash sync is carried out, the process advances to Step S2008, and otherwise the process advances to Step S1012 and ends the exposure.

When the total exposure period completely elapses in Step S2008, the process also advances to Step S1012, however, when the total exposure period does not elapse, the process returns to Step S1021 and carries out image-taking operation again. Namely, when the total exposure period elapses, the last image is also stored in the synthesizing image folder 37 according to the procedures of Step S2004. Thus, image-taking operation is repeated with the limit exposure period until the total exposure period elapses, and image data obtained through this are stored in the synthesizing image folder 37. During this repetition of image-taking operation, the correcting optical unit 11d is continuously fixed to the position where it was fixed in Step S2003.

Thus, when the correcting optical unit 11d nearly exceeds the correction range 11l during exposure, the image-taking data obtained until this point is readout, and the data is stored in a form enabling identification, and image-taking operation is started again. However, when the remaining exposure period is short or the camera is being panned, re-image-taking operation is not carried out. This is for giving priority to mobility of the camera and repressing lowering in reliability of background image synthesis.

When the process advances to Step S1012, a sound informing completion of image-taking operation is produced by driving the speaker 17a via the sound producing drive circuit 17b. This sound may be, for example, an electronic bleep sound which is different from the electronic bleep sound in Step S1008, a shutter closing sound, or a mirror lowering sound. When image-taking operation is thus carried out a plurality of times, sounds informing this are one set of sounds (each produced once when starting exposure of the first image-taking operation and when completing the exposure of the last image-taking operation), so that the sounds do not give a photographer discomfort even when image-taking operation is carried out a plurality of times. Namely, the number of sounds is equal in the case of normal image-taking operation (one exposure) and in the case of a plurality of times of image-taking operations, thereby repressing a photographer from feeling discomfort during image-taking operation.

In the next Step S1013, the shutter 12a is closed to block light entering the image pickup element 19a, and the charges accumulated in the image pickup element 19a are transferred to the signal processing circuit 111 via the A/D converter 110. Thereafter, the correcting optical unit 11d is returned to its initial position for preparation for the next image-taking operation, and when charge transfer is finished, the shutter 12a is opened. In the subsequent Step S1014, it is determined whether or not image-taking operation has been carried out a plurality of times since the correcting optical unit 11d nearly exceeded the correction range 11l during exposure when the vibration control system operates, and when image-taking operation is carried out only once, the process advances to Step S1015, and when image-taking operation is carried out two or more times, the process advances to Step S1025.

When the process advances to Step S1015, the second image correcting circuit 117b applies gamma correction processing and compression processing to the input signals (image data). Then, in the next Step S1016, the signals of the second image correcting circuit 117b are input into the display unit 118 and displayed on the back face of the camera. In Step S1017, the output signals of the second image correcting circuit 117b are input into the recording circuit 119, and the process returns to Step S1002. Herein, the signals are recorded on the normal image folder 36 (FIG. 10) in the recording circuit 119.

Furthermore, when the process advances to Sep S1025 since it is determined that image-taking operation has been carried out a plurality of times in Step S1014, the image taken by using the illumination unit among the images obtained through the plurality of times of image-taking operation (normally the first image, and the last image when the rear-curtain flash sync is set) is readout from the image storing circuit 113. Then, in the next Step S1026, the readout image is corrected by the second image correcting circuit 117b and increased in gain. This is for complementing exposure of the image when the image is displayed on the display unit 118 since each image taken by a plurality of times of image-taking operation is underexposed. Then, in the next Step S1027, the corrected image is input into the display unit 118, and displayed on the back face monitor of the camera. When the image is thus displayed on the back face monitor of the camera, no synthesized image has been produced in the camera, so that the one image among the images obtained through a plurality of times of image-taking operation (the first image when image-taking operation is carried out without using the illumination unit 16a, and when image-taking is carried out by using the illumination unit 16a, the first image in the case of front-curtain flash sync, and the last image in the case of rear-curtain flash sync) is displayed. Then, the process returns to Step S1002.

When the release operation member 12c is still depressed halfway and the sw1 is still on in Steps S1017 and S1027, the process advances in the flow in sequence again, to Steps S1002 and S1003.

On the other hand, half-depression of the release operation member 12c is released, the process returns from Step S1002 to Step S1001, and elements of the camera are reset to their initial statuses. Furthermore, when the release operation member 12c is fully depressed and the sw2 is turned on in Steps S1017 and S1027, the process does not return to start but waits in Steps S1017 and S1027.

Figure 13:
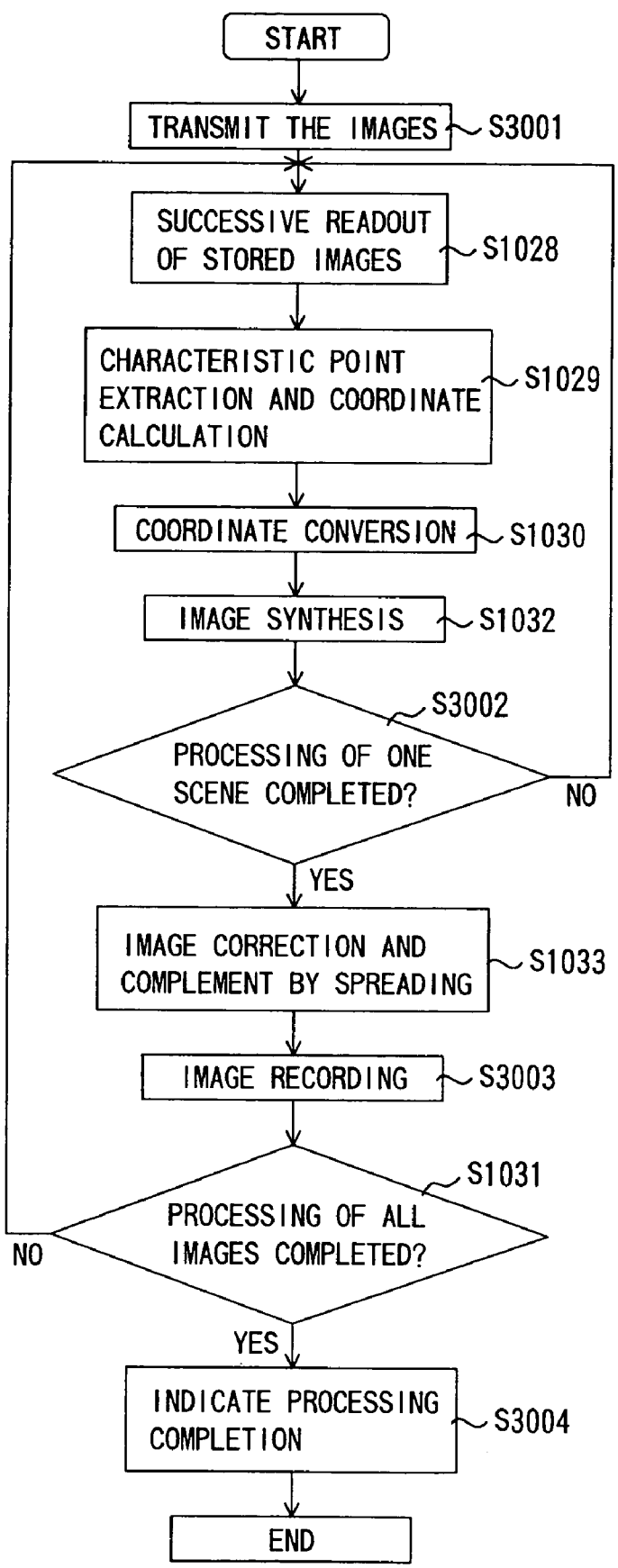
FIG. 13 is a flowchart showing image synthesis processing in Embodiment 3 of the invention.

FIG. 13 shows the flowchart of image processing in the notebook computer 33, and this flow starts when the notebook computer 33 recognizes that the synthesizing image folder 37 exists in a specified digital camera 31 or the recording circuit 119 in this camera.

In Step S3001, the synthesizing image folder 37 in the recording circuit 119 is transferred into the memory of the notebook computer 33 on a folder basis. At this point, the synthesizing image folder 37 in the recording circuit 119 is erased. Namely, when the process advances to Step S1021 of FIG. 12 in the next image-taking operation, this folder 37 is automatically re-created. As a matter of course, it is also possible that, for safety, the synthesizing image folder 37 is not moved but copied to the notebook computer 33.

In the next Step S1028, the plurality of taken images newly stored in the notebook computer 33 are readout in sequence.

Thereafter, processings of Step S1028 through Step S1033 are electronic correcting calculations which make exposure proper by synthesizing images obtained through the plurality of times of image-taking processings (images stored in the notebook computer 33) while conforming characteristic points.

In Step S1029, the characteristic points in the images are extracted. In the next Step S1030, the coordinate conversion circuit 115 applies coordinate conversion processing to the images on the basis of the coordinates of the extracted characteristic points. Herein, only the image taken by using the illumination unit 16a is not subjected to coordinate conversion processing. Namely, the image taken by using the illumination unit 16a is used as a reference image for coordinate conversion processing. This image is the first one in the case of front-curtain sync, and is the last one in the case of rear-curtain flash sync. Therefore, when reading out the images in Step S1028, in the case where the images (images 313a through 313d in FIG. 10) are taken in the rear-curtain flash sync, the images are readout in sequence from the last one (313d) and then subjected to subsequent processing. In the subsequent Step S1032, the reference image that is the first image and the next image which have been subjected to coordinate conversion processing are synthesized. Herein, the image synthesis processing is carried out by averaging the signals of corresponding coordinates of the images, and random noise in the images is reduced by averaging. Then, the image with reduced noise is increased in gain to make exposure proper.

In the next Step 3002, the process waits while circulating Steps S1028 through S3002 until coordinate conversion processing and image synthesis processing of all images of one scene (for example, the images 311a through 311e of FIG. 10) are finished, and when the above described processings with respect to the images of one scene is completed, the process advances to Step S1033. In the subsequent Step S1033, the image data is subjected to gamma correction processing and compression processing, and furthermore, the end deficient portions of the images generated when the images are synthesized are cut, and the reduction in image size is complemented by spreading. In Step S3003, the produced synthesized image is copied to a predetermined location in the normal image folder 36 of the recording circuit 119.

In the next Step S1031, it is determined whether or not processings of all the images stored in the notebook computer 33 has been completed, and when the processings of all the images are not finished (for example, synthesis processing of the images 313a through 313d of FIG. 10 is not finished), the process returns to Step S1028 and reading out of new images is started. Also in this case, the reading out sequence is changed depending on the front-curtain flash sync or rear-curtain flash sync. Thereby, when all the images are synthesized and completely recorded on the recording circuit 119, the notebook computer 33 indicates that the processing of all images are finished, in Step S3004. Along with this indication, all the images stored in the notebook computer 33 are erased.

Then, this flow ends.

The above description is given by using the digital camera 31 and the notebook computer 33, however, not limited to the notebook computer 33, it is a matter of course that a plurality of images may be processed with a desktop computer, other than personal computers, an exclusive storage or an exclusive processor which is prepared and connected to the camera, or in which a recording medium (recording circuit 119) is inserted.

Furthermore, in Step S2001 of the flow of FIG. 12A, the vibration detection sensor 11f is started. This is for detecting vibration applied to the camera, however, in the stage of object observation, by detecting vibration on the basis of the change in motion vector of the image, the driving of the vibration detection sensor 11f is unnecessary in this step, and therefore, it is also possible that the vibration detection sensor 11f is started in, for example, Step S1008 to reduce power consumption.

In Embodiment 3 described above, by omitting the step of returning the correcting optical unit 11d to its initial position and by employing a manner where image synthesis processing is not carried out in the camera, the camera mobility is improved, and in stage of the object observation, by employing electronic image blurring correction, the correcting optical unit 11d can effectively correct vibration during image-taking processing.

Embodiment 4

Figure 14:
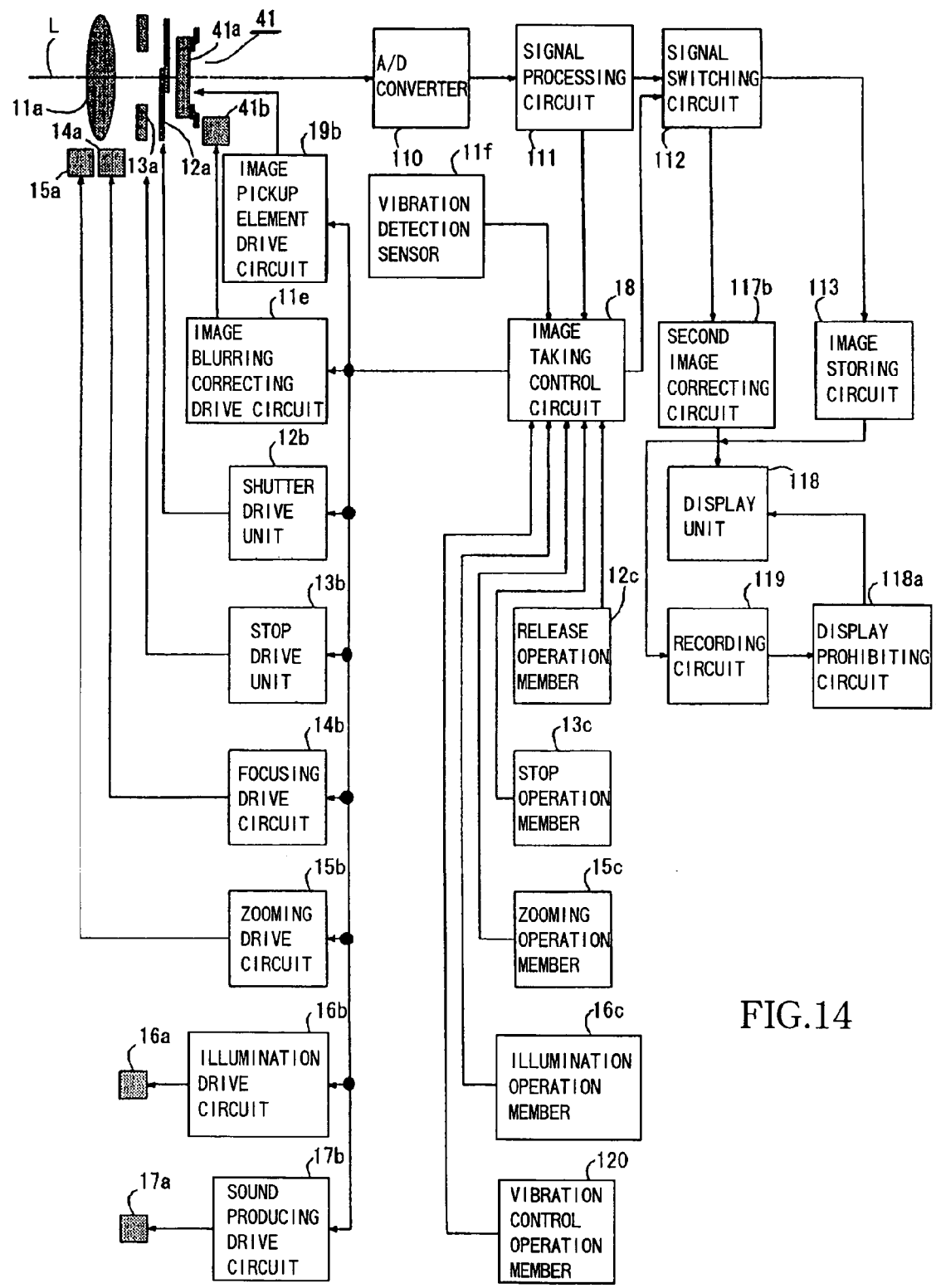
FIG. 14 is a diagram showing a structure of a camera according to Embodiment 4.

Next, Embodiment 4 of the invention is described. FIG. 14 is a diagram showing the structure of the camera according to this embodiment of the invention. The structure of the camera in this embodiment is different from the structure of the camera in Embodiment 1 (FIG. 1) in the following points.

1) The displacement detection circuit 114, the coordinate conversion circuit 115, the image synthesis circuit 116, and the first image correcting circuit 117a are not provided.
2) The correcting optical unit 11d comprising the correcting lens 11b and the correcting lens drive mechanism 11c is not provided, and a correcting unit 41 comprising an image pickup element 41a and a drive mechanism 41b is provided.

In Embodiment 4 of the invention, as in Embodiment 3 described above, images obtained by a plurality of times of image-taking operation are synthesized while being conformed by application software, so that the circuitry for image synthesis processing is not necessary inside the camera. Therefore, as described in 1) above, the displacement detection circuit 114, the coordinate conversion circuit 115, the image synthesis circuit 116, and the first image correcting circuit 117a are not provided. The same applies to Embodiment 3.

Furthermore, in Embodiments 1 through 3 described above, image blurring is corrected by shifting the correcting lens 11b of the correcting optical unit 11d, however, in Embodiment 4 of the invention, during exposure, image blurring correction operation is carried out by shifting of the image pickup element 41a within a plane substantially perpendicular to the optical axis L by the drive mechanism 41b. Namely, as described above, the correcting unit 41 comprises the image pickup element 41a and the drive mechanism 41b.

Herein, the structure of the correcting unit 41, is described with reference to FIGS. 15A to 15C. FIG. 15B is a plan view of the correcting unit 41, viewed from the camera back side, and FIG. 15C is a sectional view of the correcting unit 41 along the center line of the plane view. The arrow 40 side with respect to the image pickup element 41a is the object side (lens arrangement side).

The image pickup element 41a is connected with a flexible board 41d which transmits signals of the image pickup element 41a to the circuit (A/D converter 110). The flexible board 41d has elasticity so as not to apply a load on the movement of the image pickup element 41a (movement in the directions of the arrows 47p and 47y), and if necessary, it is possible that the movement load applied by the flexible board 41d is further reduced by providing a bending portion, which bends in the movement direction, in the flexible board 41d.

First, a structure of supporting the image pickup element 41a in a manner enabling movement is described. On the back face of the image pickup element 41a, a holding frame 42 is provided, and on the holding frame 42, engaging bearings 42a, 42b, and 42c are provided at three points. In addition, a base plate 43 is provided opposite the holding frame 42. The base plate 43 is shown in FIG. 15C, however, in FIG. 15B, it is not shown except for supporting portions 43a, 43b, and 43c for description of the driving structure of the image pickup element 41a. As shown in FIG. 15B, the supporting portions 43a, 43b, and 43c of the base plate 43 are provided at three points so as to surround the image pickup element 41a. The supporting portions 43a, 43b, and 43c are coupled with supporting pins 44 in a screwed manner.

Herein, the first engaging shafts 44a of the supporting pins 44 are engaged with the supporting portions 43a, 43b, and 43c, respectively, and the supporting pins 44 are accurately positioned with respect to the supporting portions 43a, 43b, and 43c. The supporting pins 44 are coupled with the supporting portions 43a, 43b, and 43c in a screwed manner by the screw portions 44b, so that the supporting pins 44 are movable in the axial directions inside the supporting portion 43a, 43b, and 43c by rotating the supporting pins 44 by using slots 44e. The second engaging shafts 44d formed at the front ends of the supporting pins 44 are engaged thereof with the engaging bearings 42a, 42b, and 42c.

When the engaging bearing 42a is viewed from the direction of the arrow 42h, it is as shown in FIG. 15A, wherein an elongate hole 42g is formed in the engaging bearing 42a, and the second engaging shaft 44d is engaged in the elongate hole 42g. Therefore, the second engaging shaft 44d is freely movable in the elongate hole 42g and is movable in the axial direction of the second engaging shaft 44d. However, the second engaging shaft 44d is limited in position only in the short diameter direction of the elongate hole 42g.

This engaging bearings 42a, 42b and 42c are provided at three points, and the second engaging shafts 44d whose positions are limited only in the direction of the optical axis L by engaging the engaging bearings 42a, 42b and 42c are provided, so that the holding frame 42 is limited in position in the direction of the optical axis L with respect to the base plate 43, and is supported in a manner enabling freely move in the directions shown by the arrows 47p, 47y, and 47r. Between the supporting pins 44 and the engaging bearings 42a, 42b, and 42c, compression coil springs 45 are provided.

One ends of the compression coil springs 45 are engaged with the spring receiving portions 44c of the supporting pins 44, and the other ends thereof are engaged with spring receiving portions 42d, 42e, and 42f of the engaging bearings 42a, 42b, and 42c. By the compression coil springs 45, the holding frame 42 is elastically supported on the base plate 43. Furthermore, by moving the supporting pins 44 in the axial directions with respect to the supporting portions 43a, 43b, and 43c by rotating them by using the slots 44e, the entire lengths of the compression coil springs 45 are changed to finely adjust the position of the holding frame 42 with respect to the base plate 43. If the supporting pins 44 are the eccentric pins, it becomes possible to adjust the inclination of the image plane of the image pickup element 41a with respect to the optical axis by rotating the supporting pins 44. In this case, the entire lengths of the compression coil springs 45 are also changed. In order to avoid this, it is also possible that the screw portions 44b of the supporting pins 44 are omitted, the supporting pins 44 are pressure-fitted into the supporting portions 43a, 43b, and 43c, and after adjusting the inclination of the image plane is finished, the supporting pins 44 and the supporting portions 43a, 43b, and 43c are adhesively fixed.

With this structure, the image pickup element 41a is supported onto the base plate 43 fixed to the camera in a movable manner in the directions of the arrows 47p, 47y, and 47r. The movements of the image pickup element in the direction of the arrows 47p and 47y are necessary for the purpose of image blurring correction. On the other hand, when image blurring with respect to the direction of the arrow 47r is not corrected on the basis of the vibration detection result, it is not necessary to rotate the image pickup element 41a around the optical axis (in the direction of the arrow 47r).

The three compression processing coil springs 45 are engaged with both the holding frame 42 and the supporting pins 44, and the rotation in the direction 47r is limited by the elastic force act in a direction other than the compression direction. However, when the drive mechanism of the image pickup element 41a described later becomes unbalanced, the image pickup element 41a may slightly rotate in the direction 47r. This rotation may cause image blurring on the image plane.

In the case where image blurring is corrected by driving the correcting lens as in Embodiments 1 through 3, the image is not changed even when the correcting lens is rotated around the optical axis, and the driving error in the rotation direction 47r is negligible. However, in the case where the image pickup element 41a is driven as in Embodiment 4, the error is not negligible. Therefore, in addition to the mechanism which limits the position of the image pickup element 41a in the optical axis L direction, a mechanism which limits the rotation in the direction 47r is provided in the following manner.

Elongate holes 46a of a rotation limiting ring 46 are engaged with rotation limiting pins 42i protruding from the holding frame 42. Here, the rotation limiting pins 42i are engaged only in the short diameter directions of the elongate holes 46a. Therefore, the holding frame 42 is supported in a movable manner in the direction of the arrow 47y with respect to the rotation limiting ring 46, and the movement thereof in the direction 47r is limited. Likewise, the elongate holes 46b of the rotation limiting ring 46 are engaged with rotation limiting pins 43d protruding from the base plate 43. Here, the rotation limiting pins 43d are engaged only in the short diameter directions of the elongate holes 46b. Therefore, the rotation limiting ring 46 is supported in a movable manner in the direction of the arrow 47p with respect to the base plate 43, and the movement thereof in the direction 47r is limited. With this structure, the rotation limiting ring 46 does not obstruct the movements in the directions of the arrows 47p and 47y of the holding frame 42 with respect to the base plate 43, and limit only the movements in the direction of the arrow 47r.

Next, the method of moving the image pickup element 41a in the directions of the arrows 47p and 47y is described.

On the back face of the holding frame 42, coils 48p and 48y are concentrically provided and bonded. The coils 48p and 48y are opposite permanent magnets 49p and 49y provided on the base plate 43.

Herein, the coil 48y is provided on the outside of the coil 48p and has a large diameter than that of the coil 48p, and the short-side regions of the coil 48y are opposite the permanent magnet 49y. The long-side regions of the coil 48p are opposite the permanent magnet 49p. The short-side regions of the coil 48y and the long-side regions of the coil 48p are set to the same length, so that a driving force obtained by the combination of the permanent magnets and the coils is set to be equal between the direction of the arrow 47p and the direction of the arrow 47y. For example, when the same current of 0.1 A is applied to the coils 48p and 48y, the generated driving forces in the direction of the arrows 47p and 47y becomes equal.

Thus, the image pickup element 41a is driven for image blurring correction by the coordination of the coils 48p and 48y and the permanent magnets 49p and 49y. In this embodiment, as shown FIGS. 15B and 15C, the coils 48p and 48y are attached to the holding frame 42 and the permanent magnets 49p and 49y are attached to the base plate 43. However, it is also possible that the permanent magnets 49p and 49y are attached to the holding frame 42 and the coils 48p and 48y are attached to the base plate 43. In this case, since it is unnecessary to provide the power supply lead wires (or flexible board) for the coils 48p and 48y on the movable side (holding frame 42 side), the load applied to the power supply lead wires can be reduced accordingly. Furthermore, it is a matter of course that the permanent magnets 49p and 49y can be replaced by electromagnets.

Next, the control when the image blurring correction operation is carried out by using the image pickup element 41a is described.

The simplest method that realizes downsizing is driving by making balance in driving force with the spring forces of the compression coil springs 45. Namely, currents are applied to the coils 48p and 48y so that a driving force corresponding to the spring forces of the compression coil springs 45 according to the amount of movement of the image pickup element 41a is generated. The case of this open driving control has an advantage in that the driving control can be realized with a compact size at low cost. At the same time, in this method, the image blurring correction driving band is obtained only for the natural frequency that is determined by the mass of the driven member (the image pickup element 41a and the holding frame 42, etc.) and the spring constant of the compression coil springs 45.

In order to widen the image blurring correction driving band, the driven member are lightened in weight or the spring constant of the compression coil springs 45 is increased. However, the former method is limited due to the size of the image pickup element 41a, and the latter method requires more driving electric power (due to the strong spring force). In order to widen the image blurring correction driving band, there is a method (position feedback) in which a magnetism detection element such as a hall element is provided on the holding frame 42 and the relative positional change of the holding frame 42 with respect to the permanent magnets 49p and 49y are detected in each direction of the arrows 47p and 47y, and the detection signals are negatively fed back to the coils 48p and 48y although this method is not shown in FIG. 15. By setting the loop gain greater at this time, the image blurring correction driving band can be secured more than the natural frequency. For detection of the relative positional changes, not only the magnetism detection element but also an optical position detection element such as a PSD (Position Sensitive Detector) can be used.

In the conventional correcting optical unit, for example, as described in Japanese Patent No. 2720955, driving coils are arranged around the correcting lens. However, in the case where the image pickup element 41a is shifted, the driving coil may be arranged within a region overlapping with the image pickup element 41a as viewed from one side of the optical axis L. In the case of a correcting lens, if driving coils are arranged behind the correcting lens, the light flux is eclipsed by the driving coils.

Thus, when the image pickup element 41a is shifted, by providing the coils 48p and 48y to the back face side of the image pickup element 41a, the correcting unit 41 can be significantly reduced in size. In actuality, the coils 48p and 48y are attached to the holding frame 42 that holds the image pickup element 41a, however, as shown in FIG. 15C, it can be considered that the coils 48p and 48y are directly attached to the back face of the image pickup element 41a.

When the coils 48p and 48y are attached to the back face of the image pickup element 41a, the sizes of the coils 48p and 48b are determined depending on the size of the image pickup element 41a. Therefore, it is not possible to attach very large coils, and this limits the correction range (corresponding to the correction range 111) of the image pickup element 41a. Furthermore, as described above, the flexible board 41d is connected to the image pickup element 41a. It has been described above that the load of the flexible board 41d is small when the image pickup element 41a is shifted for image blurring correction, however, if the correction range 11l is widened, the load may become great. Therefore, the correcting drive range of the image pickup element 41a for image blurring correction is limited.

However, as described in Embodiments 1 through 3 of the invention, when the movement amount of the correcting unit (image pickup element 41a) 41 exceeds or nearly exceeds the correction range 111, that is, when the correction stroke of the correcting unit 41 is reduced, re-image-taking operation is carried out, and a plurality of taken images are conformed in position (conformed with a position where correlation of the plurality of images becomes minimum) and are synthesized, whereby the displacement among the images can be electrically corrected even when the movement amount of the image pickup element 41*a* is limited within the correction range 111. Therefore, it is not necessary to increase the size of the correcting unit 41 for securing a large correction range 111 of the image pickup element 41*a*.

Even in the case of the correcting unit 41 shown in FIG. 14 which drives the image pickup element 41*a* for vibration correction, it is possible that image-taking operation is started as shown in the flowchart of FIG. 12, and when the image pickup element 41*a* nearly exceeds the correction range 111, image-taking operation is temporarily stopped, the image pickup element 41*a* is fixed at this position, and re-image-taking operation is repeated, or when there is a high responsiveness with respect to the shift of the image pickup element 41*a* and the image pickup element 41*a* nearly exceeds the correction range 111, image-taking operation is temporarily stopped, the image pickup element 41*a* is returned to its initial position, and re-image-taking operation is repeated while correcting image blurring again.

By shifting the image pickup element 41*a* for image blurring correction as described above, a small-sized correcting unit 410 is realized.

Embodiment 5

Figure 16:
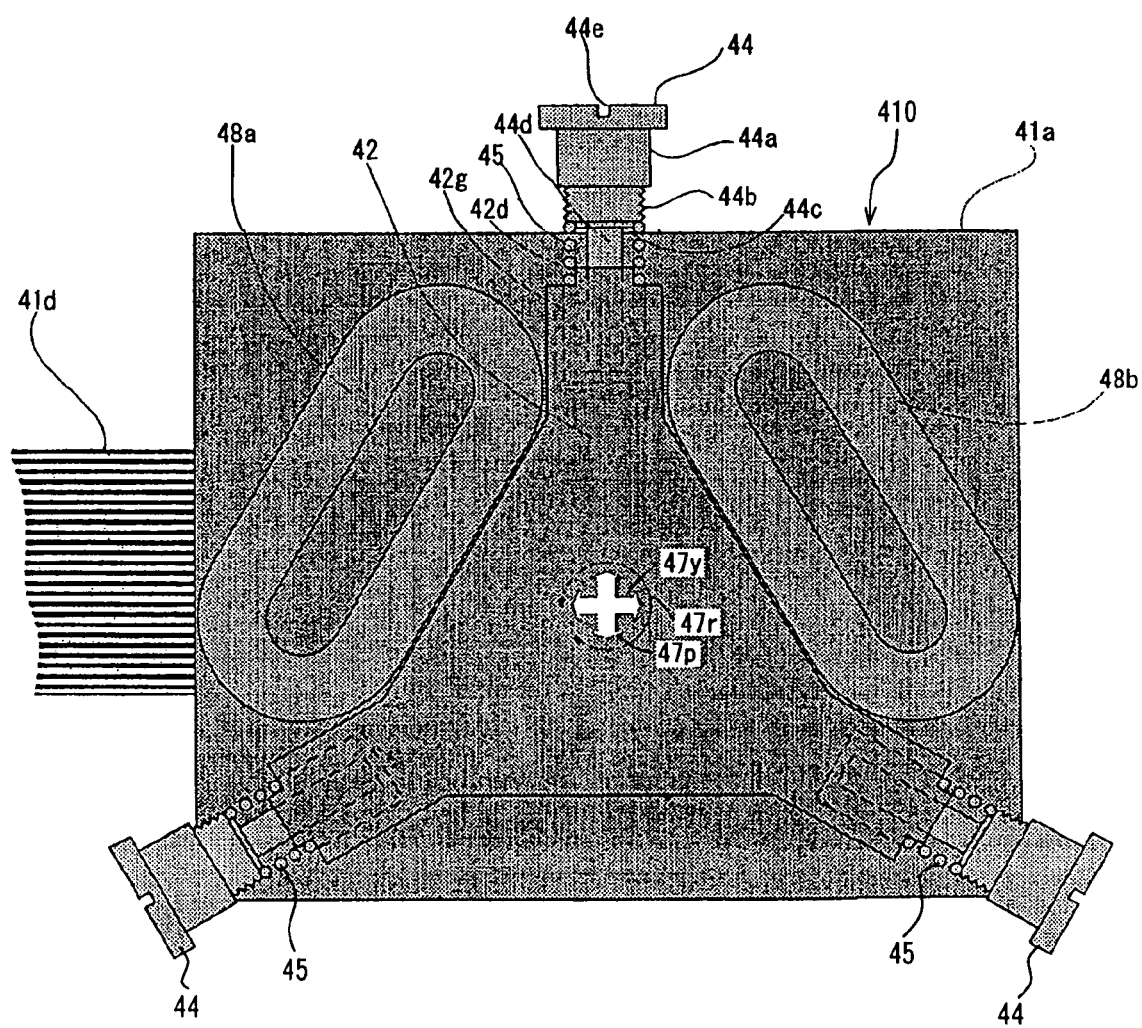
FIG. 16 is a structural diagram of a correcting optical unit using an image pickup element in Embodiment 5 of the invention.
Figure 17:
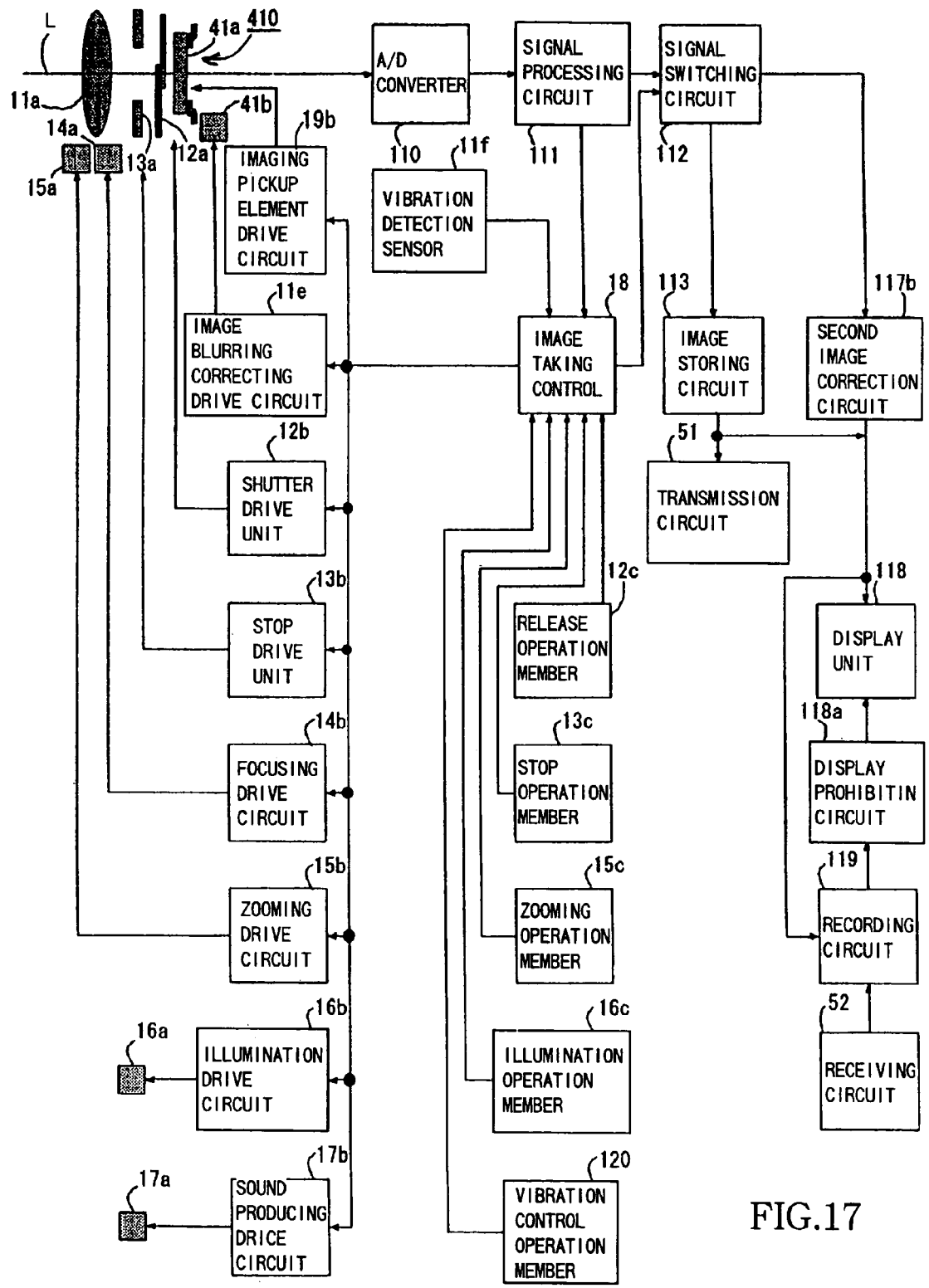
FIG. 17 is a structural diagram showing a structure of a camera according to Embodiment 5 of the invention.

Next, Embodiment 5 of the invention is described. FIG. 16 shows a correcting unit 410 which has the image pickup element 41*a* in Embodiment 5 of the invention. The correcting unit 410 comprises, as shown in FIG. 17 described later, the image pickup element 41*a* and the drive mechanism 41*b*. Basically, the correcting unit 410 is the same as the correcting unit 41 of FIG. 15, so that the members having the same functions are indicated with the same numerals. In order to make the illustration simple, the base plate 43 and the permanent magnets 49*p* and 49*y* are omitted in FIG. 16.

Figure 15:
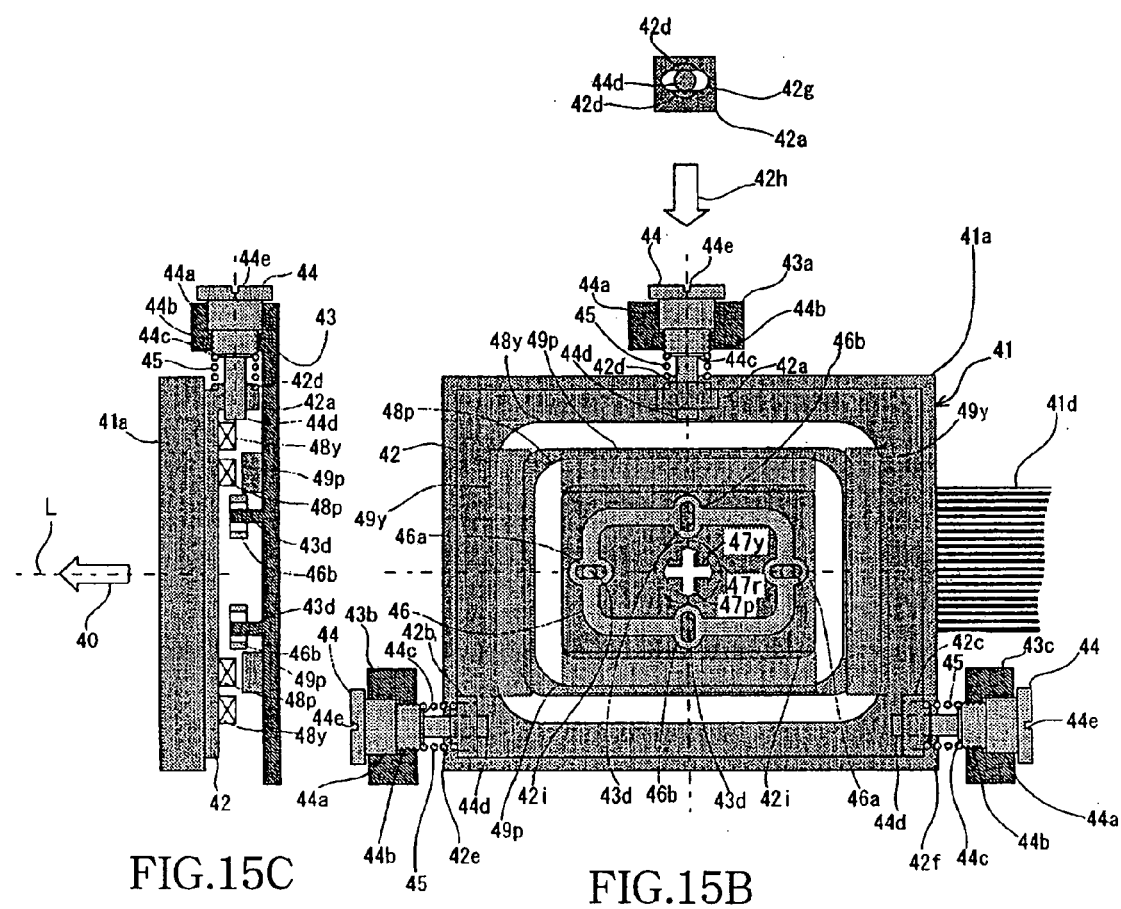
FIGS. 15A to 15C are structural diagrams of a correcting optical unit using an image pickup element in Embodiment 4 of the invention.

The difference from the correcting unit 410 of FIG. 15 is that the supporting pins 44 are arranged in the radial directions, and according to the positional relationship of these, the coils 48*a* and 48*b* are arranged.

The supporting pins 44 are provided radially at three points segmented by 120 degrees around the center of the holding frame 42, whereby the image pickup element 41*a* is supported in a plane balanced manner. The second engaging shafts 44*d* of the supporting pins 44 are engaged in the elongate holes 42*g* of the holding frame 42, whereby the image pickup element 41*a* is limited in movement only in the direction of the optical axis L (not shown in FIG. 16) as in Embodiment 4, and can freely move in the directions of the arrows 47*p*, 47*y*, and 47*r*. In Embodiment 4 (see FIGS. 15A to 15C), the rotation 47*r* of the image pickup element 41*a* around the optical axis is limited by the rotation limiting ring 46. On the other hand, in Embodiment 5 (FIG. 16), the rotation of the image pickup element 41*a* is elastically limited by the spring forces in the bending directions (directions other than the compression directions) of the compression coil springs 45.

For efficiency of the attachment spaces, different from FIG. 15B, the coils 48*a* and 48*b* are arranged diagonally with respect to the lengthwise direction and the lateral direction of the image pickup element 41*a*. Herein, when the currents with the same phase are applied to the coils 48*a* and 48*b*, the image pickup element 41*a* moves in the direction of the arrow 47*p*, and when currents with phases reverse to each other are applied, the image pickup element 41*a* moves in the direction of the arrow 41*y*. Therefore, the amount of movement of the image pickup element 41*a* is determined by the amounts of currents to be applied to the coils 48*a* and 48*b*, and the direction of movement of the image pickup element 41*a* is determined by the current phase relationship between the two coils 48*a* and 48*b*, whereby position control of the image pickup element 41*a* is carried out.

FIG. 17 is a diagram showing the structure of the camera according to Embodiment 5 of the invention, wherein, other than the above-described correcting unit 410, it is different from FIG. 14 only in the point that the transmission circuit 51 and the receiving circuit 52 are provided.

When it is required that images obtained by carrying out image-taking operation a plurality of times are synthesized into one image, that is, when the correcting unit 410 nearly exceeds the correction range 11*l* during exposure and re-image-taking operation is carried out, the plurality of taken images are transmitted to a base station, for example, a web site provided by a distributor, etc., of the camera via the transmission circuit 51.

At the base station, the received data is processed in the same manner as in Embodiment 3 to create one synthesized image, and the synthesized image is transmitted to the camera. The camera receives the synthesized image from the base station and records it on the recording circuit 119, and erases the plurality of images for synthesis stored in the image storing circuit 113. Since, image synthesis processing is carried out at the base station and the synthesized image is received, the memory for images can be reduced, and a synthesized image can be obtained and replayed sooner than in the case where the photographer returns to his home and starts the application software for image synthesis processing.

Figure 18A:
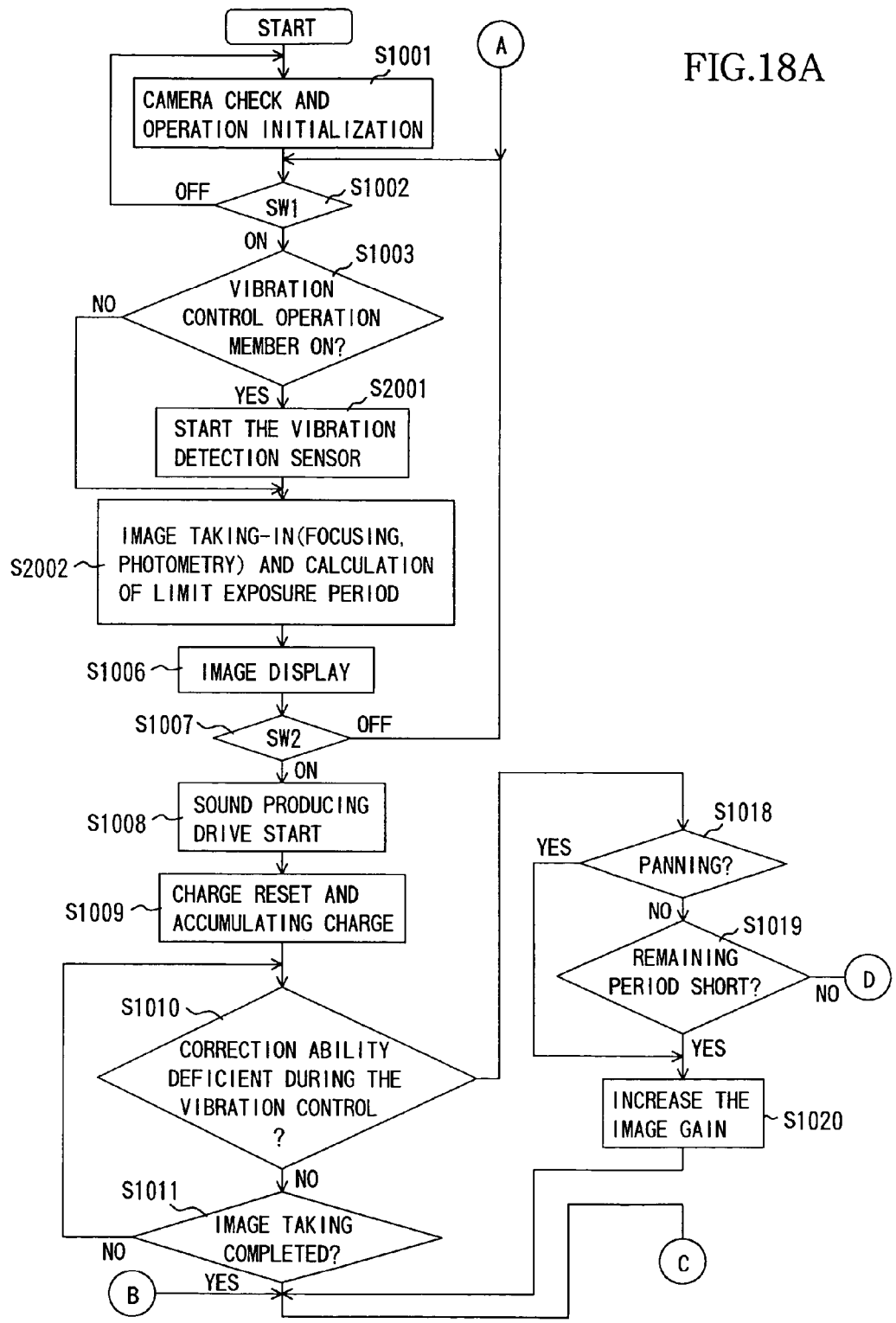
FIGS. 18A to 18C are flowcharts showing image-taking operations in Embodiment 5 of the invention.
Figure 18B:
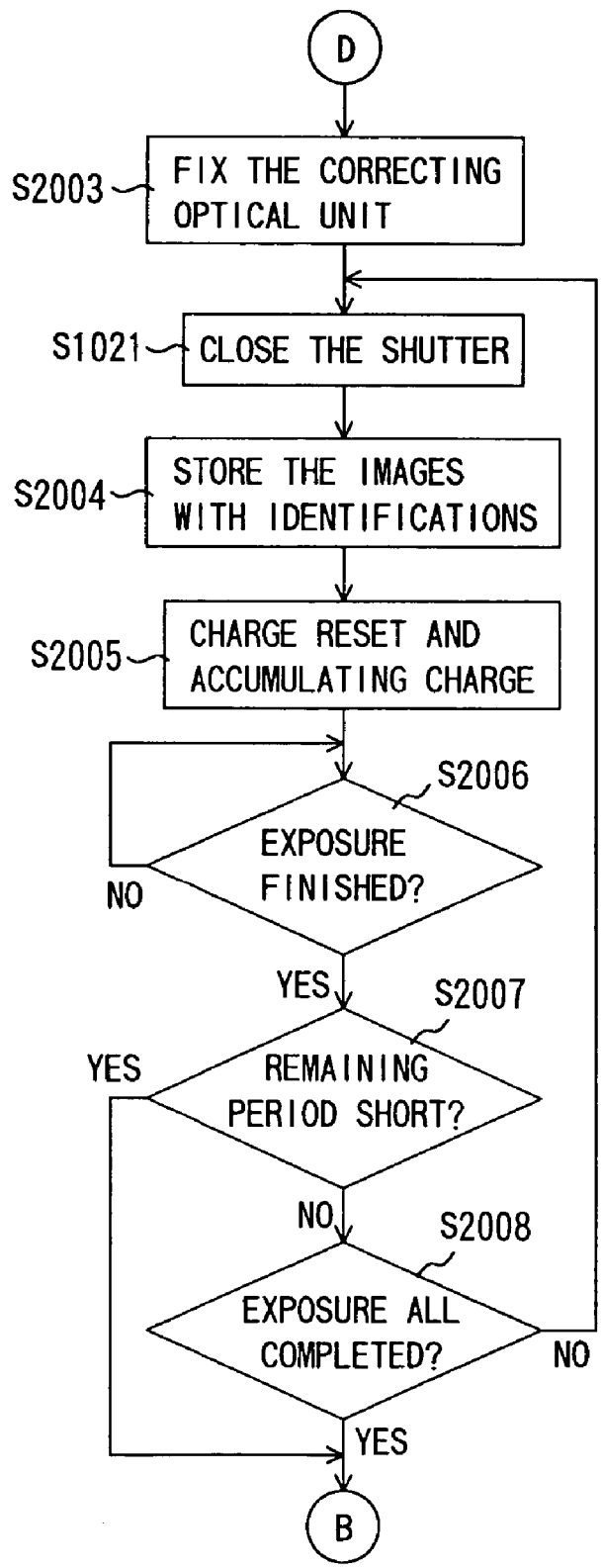
Figure 18C:
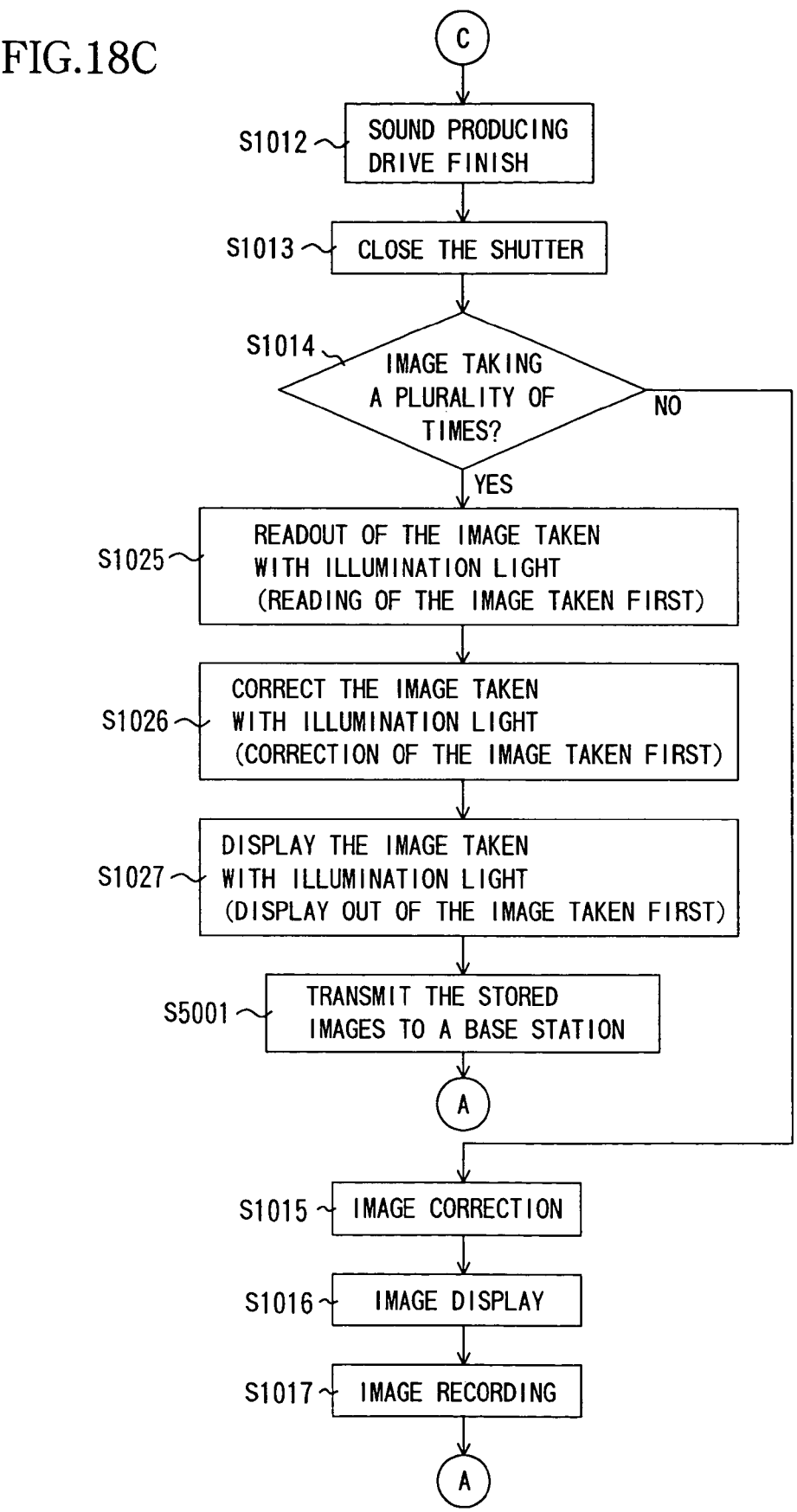

FIGS. 18A to 18C are flowcharts of Embodiment 5 of the invention, and this flow is basically similar to the flow of FIG. 12 of Embodiment 3, so that only the differences are described herein.

In Step S2004 of FIG. 18B, the image data produced by the signal processing circuit 111 is stored. The images to be stored in Step S2004 are uncompleted image data obtained when the movement of the correcting unit 410 nearly exceeds the correction range 11*l* during image-taking operation, so that the images are not stored in the normal image folder 36 shown in FIG. 19 in the recording circuit 119, but are stored in a transmitting image folder 61. Here, only the predetermined image (the first one in the case of front-curtain flash sync, and the last one in the case of rear-curtain flash sync when image-taking operation is carried out by using the illumination unit 16*a*, and the first one when the illumination unit 16*a* is not used) is stored in the normal image folder 36 also.

In Step S1027 of FIG. 18C, the image taken by using the illumination unit 16*a* (the first image when image-taking operation is carried out without using the illumination unit 16*a*) is displayed on the camera back face liquid crystal monitor (display unit 118), and in the next Step S5001, the images stored in the transmitting image folder 61 are transmitted to a camera base station, and simultaneously the process returns to Step S1002.

In a case where the communications status is defective or the power source of the camera is cut off, transmission of image data is started again when the communications status is recovered or the camera power source is turned on again.

Figure 20:
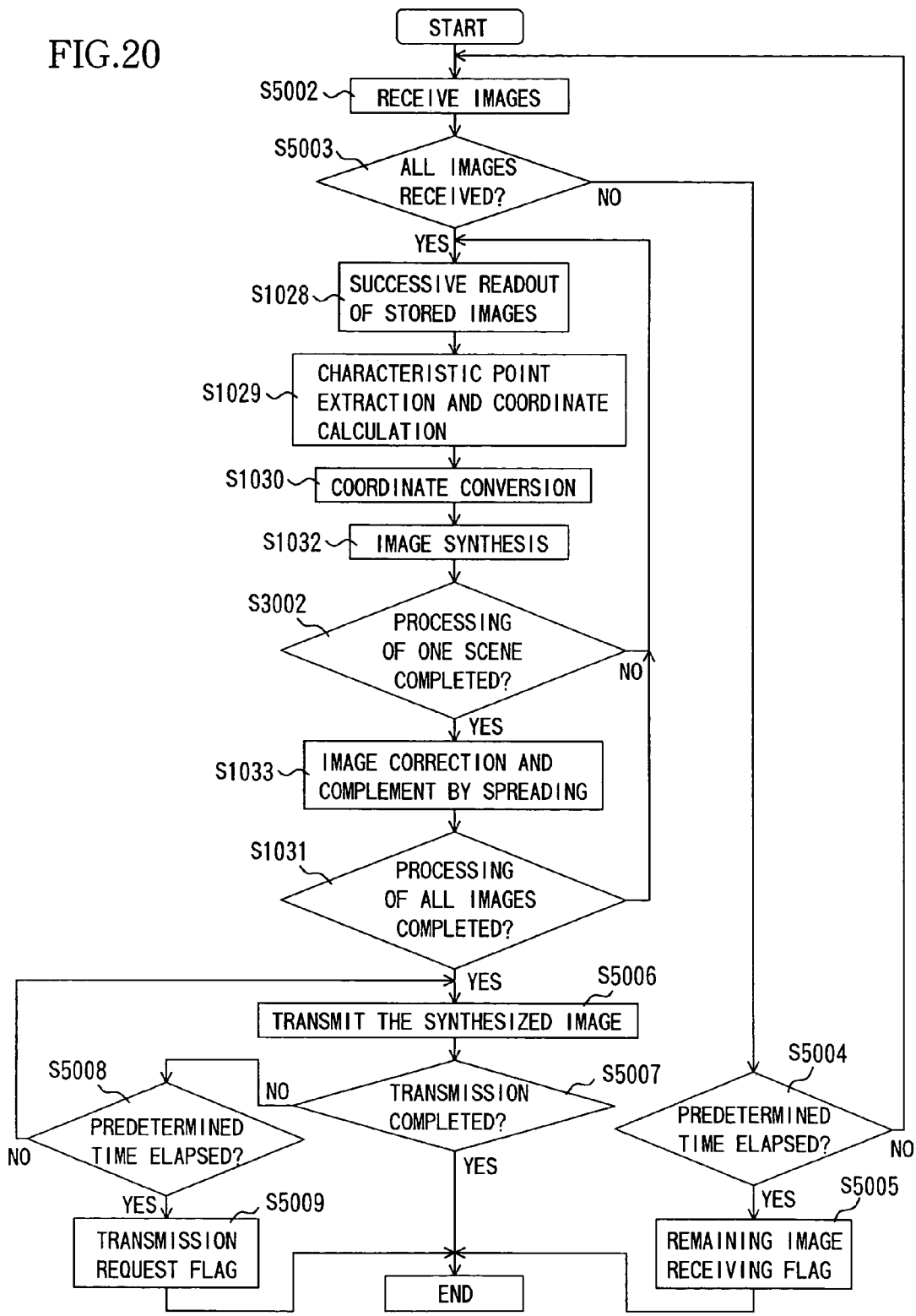
FIG. 20 is a flowchart showing a image synthesis processing in Embodiment 5 of the invention.

The transmitted images are synthesized at the base station, and the flowchart of this operation is shown in FIG. 20.

The flowchart of FIG. 20 is basically similar to the flowchart of FIG. 13, so that only the differences are described herein. This flow starts when images are transmitted from the camera to the base station.

In Step S5002, the images transmitted from the camera are continuously received and recorded on a memory of the base station. At the initial point of this receiving operation, information on the number of images to be transmitted from the camera to the base station is transmitted. Therefore, in Step S5003, the process waits until the image data of this number of images is received. Then, when receiving operation is finished, the process advances to Step S1028.

Until the receiving operation is finished, the process waits while circulating Steps S5002 and S5003 through Step S5004.

In Step S5004, the elapsed time from the start of receiving is counted, and when a predetermined time (for example, 10 seconds) elapses, the process advances to Step S5005, and otherwise the process returns to Step S5002. This is for determining a communications failure or abnormality in the power source of the camera when the receiving period is long. Then, in such a case, the base station recognizes in Step S5005 that images that have not been received exist, and the base station is set so as to receive the remaining images when receiving operation is re-started and this flow ends.

Since steps S1028 through S1031 are included in the flow of image synthesis processing described in FIG. 13, description thereof is omitted.

In Step S5006, the synthesized images produced until Step S1031 are all transmitted to the camera. In the next Step S5007, the process waits while circulating Steps S5007, S5008, and S5006 until transmission operation of these images is completed. Then, when transmission is completed, this flow ends.

In Step S5008, the elapsed time from the start of transmission operation is counted, and when a predetermined time (for example, 10 seconds) elapses, the process advances to Step S5009, and otherwise the process returns to Step S5006. This is for determining a communications failure or the off status of the power source of the camera when the transmission period is long. In such a case, the base station recognizes in Step S5009 that images that have not been transmitted exist, and when a next receiving request is made from the camera, that is, when the communications are recovered or the camera power source is turned on, the base station is set so as to transmit the remaining images to the camera and this flow ends.

Figure 21:
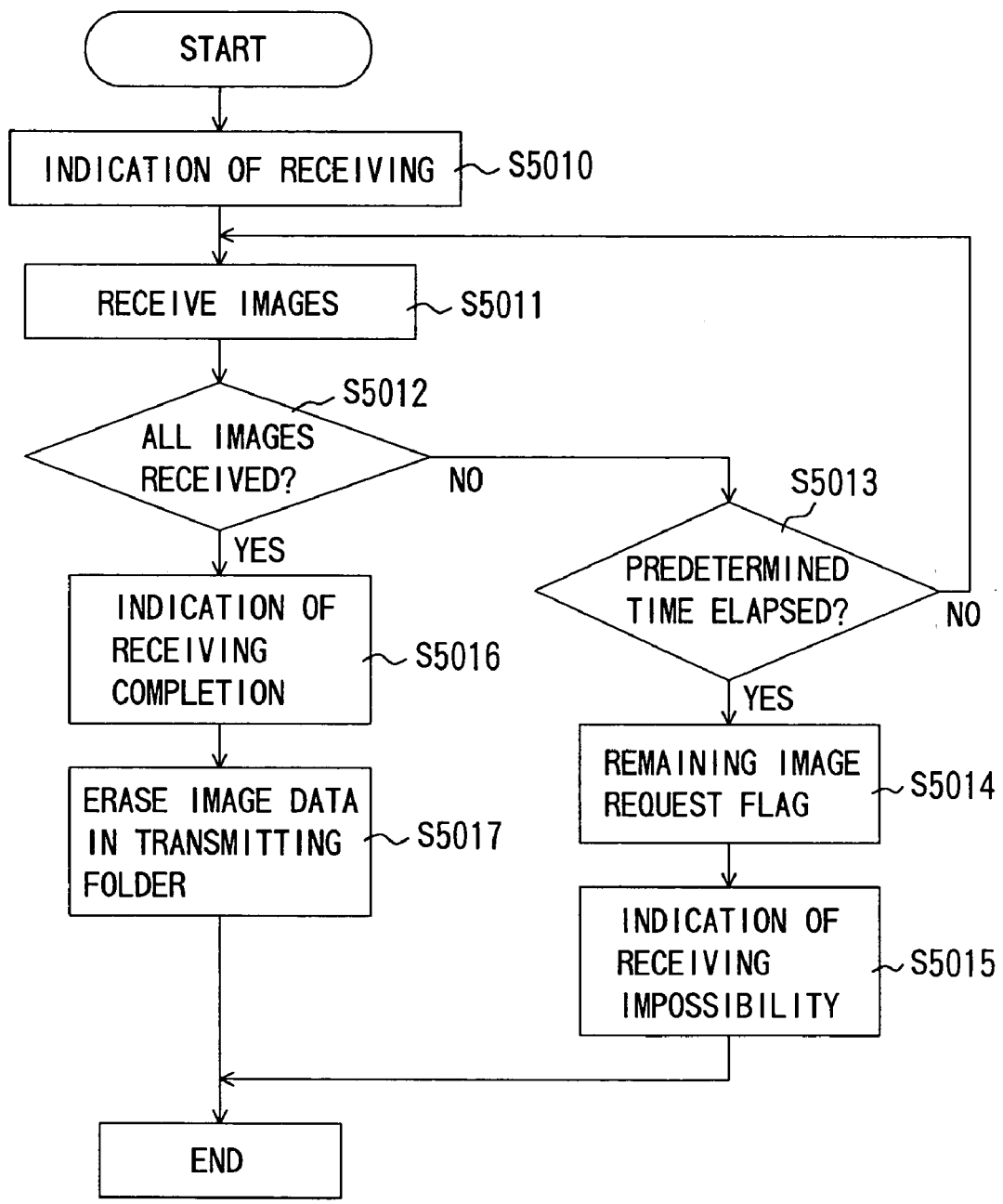
FIG. 21 is a flowchart showing receiving processing of the camera according to Embodiment 5 of the invention.

FIG. 21 is a flowchart showing the operation of the camera side when the synthesized image transmitted from the base station is received at the camera side. This flow starts when synthesized image is transmitted from the base station to the camera.

In Step S5010, the start of receiving images when the images are transmitted from the base station is indicated. Thereby, it is repressed that the camera power source is cut off or the battery is removed during receiving. In the next Step S5011, the images transmitted from the base station are continuously received and recorded on the recording circuit 119 of the camera. At the initial point of this receiving operation, information on the number of images to be transmitted from the base station to the camera is transmitted. Therefore, in Step S5012, the process waits until the image data of the number of images are received. Then, when receiving operation is finished, the process advances to Step S5016.

Until the receiving operation is finished, the process waits while by circulating Steps S5011 and S5012 through Step S5013.

In Step S5013, the elapsed time from the start of receiving operation is counted, and when a predetermined time (for example, 10 seconds) or more elapses, the process advances to Step S5014, and otherwise the process returns to Step S5011. This is for determining a communications failure or abnormality in the power source of the camera when the receiving period is long. Then, in such a case, the camera recognizes in Step S5014 that images that have not been received exist, and the camera is set so as to make a request for receiving the remaining images when the communications status is recovered or the power source status of the camera becomes normal.

In Step S5015, a receiving failure is indicated and this flow is ended. In Step S5016, it is indicated that receiving of all the images has been finished.

Figure 19:
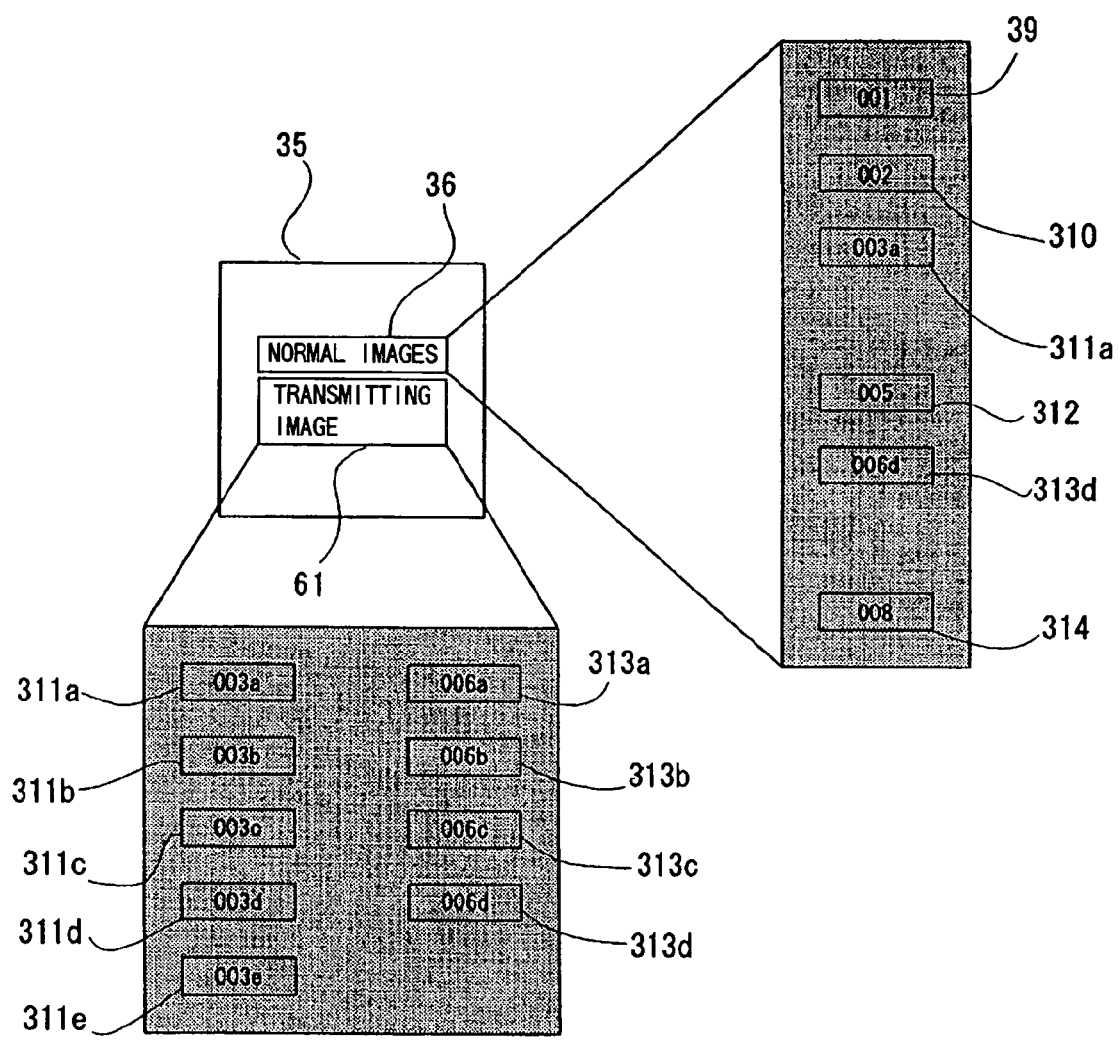
FIG. 19 is a diagram showing a file storing status in Embodiment 5 of the invention.

In Step S5017, all the image data in the transmitting folder 51 of FIG. 19 is erased and this flow is ended.

A digital camera which can access a web site on the Internet has already been commercialized, and as described above, by using this function, the image blurring correction processing is carried out. Therefore, an image with high quality can be obtained without a great load on the image processing and the memory. Furthermore, this function of this embodiment can be provided for not only digital cameras but also portable phones with cameras. In portable phones with cameras, the extreme vibration occurs frequently due to the method of holding the portable phones, and by performing the above-described image blurring correction processing, the image quality of the camera can be significantly improved.

Furthermore, for downsizing portable phones, in place of providing the correcting optical unit 11d and the vibration detection sensor 11f as described above, a method is employed in which a plurality of images are continuously taken with a short exposure period, and a base station that has received these images synthesizes the images and transmits them to the original portable phone or the user's personal computer, whereby the system can be downsized.

The present invention applies to a camera with a lens and a camera system having a lens apparatus and a camera to which the lens apparatus is attached. In a case of the camera system, the correcting optical unit 11d, which is explained in Embodiment 1, is provided in the lens apparatus. And the correcting units 41 and 410, which are explained in Embodiments 4 and 5, are provided in the camera.

While preferred embodiments have been described, it is to be understood that modification and variation of the present invention may be made without departing from the scope of the following claims.

This application claims priority from Japanese Patent Application No. 2003-309671 filed on Sep. 2, 2003, which is hereby incorporated by reference herein.

What is claimed is:

1. An image-taking apparatus comprising:
an image pickup element which photoelectrically converts an object image formed by an image-taking optical system into an electrical signal;
a detection sensor which detects vibration; and
a control circuit which controls driving of a correcting lens unit being disposed in the image-taking optical system and corrects image blurring by moving the correcting lens unit within a plane substantially orthogonal to an optical axis of the image-taking optical system,
wherein in a case where it is not possible to move the correcting lens unit according to a result of the detection by the detection sensor after starting an image-taking operation, the control circuit (a) stops the correcting lens unit at a present position, (b) stops a first exposure of the image pickup element in the image-taking operation to generate first image data based on an output signal of the image pickup element before stopping the correcting lens unit, (c) carries out successively a second exposure at a predetermined period while the correcting lens unit is positioned at the present position to generate at least one second image data to be synthesized together with the first image data, and (d) stops the second exposure when total period of the first and second exposures reaches a proper exposure period determined before the image-taking operation.

2. The image-taking apparatus according to claim 1, wherein in a case where a remaining period representing a difference between the proper exposure period and a period of the first exposure is shorter than a predetermined period, the control circuit prohibits the restart of the image-taking operation the second exposure.

3. The image-taking apparatus according to claim 1, further comprising:
   a detection circuit which detects a displacement between a reference image and another image among the first and second image data;
   a coordinate conversion circuit which applies coordinate conversion to the another image so as to conform the another image to the reference image based on a result of the detection by the detection circuit; and
   a synthesis circuit which produces a synthesized image by synthesizing the another image to which the coordinate conversion is applied and the reference image.

4. The image-taking apparatus according to claim 1, further comprising:
   a recording circuit which records the second image data on a recording medium in a form enabling identification.

5. The image-taking apparatus according to claim 3, wherein the reference image is an image obtained through exposure with illumination light.

6. The image-taking apparatus according to claim 3, wherein in a stage of image-taking, the control circuit can start the second exposure according to the result of the detection by the detection sensor, and in a stage of object observation, the control circuit retains the correcting lens unit at the reference position and changes a region read out in each image obtained by using the image pickup element.

7. An image-taking system comprising:
   the image-taking apparatus according to claim 1; and
   a lens apparatus which is attached to the image-taking apparatus and has the image-taking optical system including the correcting lens unit.

* * * * *